(12) United States Patent
Li et al.

(10) Patent No.: US 10,972,575 B2
(45) Date of Patent: Apr. 6, 2021

(54) METHOD AND SYSTEM FOR SUPPORTING EDGE COMPUTING

(71) Applicants: Xu Li, Nepean (CA); Hang Zhang, Nepean (CA); Ngoc Dung Dao, Ottawa (CA)

(72) Inventors: Xu Li, Nepean (CA); Hang Zhang, Nepean (CA); Ngoc Dung Dao, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 237 days.

(21) Appl. No.: 15/989,863

(22) Filed: May 25, 2018

(65) Prior Publication Data

US 2018/0352050 A1 Dec. 6, 2018

Related U.S. Application Data

(60) Provisional application No. 62/514,594, filed on Jun. 2, 2017.

(51) Int. Cl.
| | | |
|---|---|---|
| G06F 15/16 | (2006.01) | |
| H04L 29/08 | (2006.01) | |
| H04W 8/08 | (2009.01) | |
| H04W 8/12 | (2009.01) | |

(52) U.S. Cl.
CPC ........ *H04L 67/2852* (2013.01); *H04L 67/327* (2013.01); *H04W 8/08* (2013.01); *H04W 8/12* (2013.01)

(58) Field of Classification Search
CPC .... H04L 67/2852; H04L 67/327; H04W 8/08; H04W 8/12
See application file for complete search history.

(56) References Cited

U.S. PATENT DOCUMENTS

| | | | | |
|---|---|---|---|---|
| 7,418,004 B2 * | 8/2008 | Chou | .................. | H04L 41/5019 370/449 |
| 7,948,952 B2 * | 5/2011 | Hurtta | .................. | H04M 7/006 370/338 |

(Continued)

OTHER PUBLICATIONS

"Numbering, addressing and identification"; 3GPP TS 23.003 V14.3.0 (Mar. 2017).

(Continued)

*Primary Examiner* — Razu A Miah

(57) ABSTRACT

A method, apparatus and system for supporting Mobile Edge Computing (MEC) in a network such as a 5G communication network. Application Function (AF) request data is received from an AF operating in the network in support of MEC, stored in memory, and transmitted from the memory to one or more Policy Control Functions (PCFs) operating in the network. Subscribing PCFs may be notified of the receipt and storage of the data and request retrieval of the data. The data may be stored and handled by a function referred to as the Application Data Repository, or by another data repository. The operations may be performed by a network function such as but not limited to an Application Data Repository function. The function can store the AF request data and notify the PCFs. The function can handle AF requests associated with roaming UEs.

20 Claims, 20 Drawing Sheets

(56) References Cited

U.S. PATENT DOCUMENTS

| | | | | |
|---|---|---|---|---|
| 8,400,916 B2* | 3/2013 | Cutler | H04L 41/5029 | 370/230 |
| 8,699,416 B2* | 4/2014 | Kurokawa | H04W 8/12 | 370/328 |
| 8,769,197 B2* | 7/2014 | Yochai | G06F 11/2092 | 711/113 |
| 9,344,906 B2* | 5/2016 | Morrill | H04W 24/02 | |
| 9,521,149 B2* | 12/2016 | Sachs | H04L 63/061 | |
| 10,383,133 B2* | 8/2019 | Rubin | H04W 48/02 | |
| 2006/0167985 A1* | 7/2006 | Albanese | H04L 63/08 | 709/203 |
| 2009/0010201 A1* | 1/2009 | Kawakami | H04L 45/50 | 370/328 |
| 2010/0087191 A1* | 4/2010 | Kocsis | H04W 12/06 | 455/433 |
| 2010/0146328 A1* | 6/2010 | Yochai | G06F 11/2028 | 714/4.12 |
| 2010/0325194 A1* | 12/2010 | Williamson | H04L 67/26 | 709/203 |
| 2011/0032874 A1* | 2/2011 | Kim | H04W 8/08 | 370/328 |
| 2011/0055293 A1* | 3/2011 | Tevis | G06F 16/217 | 707/812 |
| 2012/0158872 A1* | 6/2012 | McNamee | H04L 67/1095 | 709/206 |
| 2013/0013726 A1* | 1/2013 | Westberg | H04L 67/2847 | 709/213 |
| 2013/0060653 A1* | 3/2013 | Sharkey | H04L 69/321 | 705/26.3 |
| 2013/0343325 A1* | 12/2013 | Nishida | H04W 36/0011 | 370/329 |
| 2014/0064070 A1 | 3/2014 | Paladugu et al. | | |
| 2014/0075009 A1* | 3/2014 | Kovalenko | H04L 65/80 | 709/224 |
| 2014/0189772 A1* | 7/2014 | Yamagishi | H04N 21/2225 | 725/116 |
| 2014/0310339 A1* | 10/2014 | Yong | H04L 67/2842 | 709/203 |
| 2014/0344345 A1* | 11/2014 | Venkatraman | H04L 61/6009 | 709/203 |
| 2015/0078245 A1* | 3/2015 | Anchan | H04M 13/00 | 370/312 |
| 2015/0288593 A1* | 10/2015 | Campbell | H04L 65/80 | 709/224 |
| 2016/0057607 A1 | 2/2016 | Dubesset et al. | | |
| 2016/0156571 A1* | 6/2016 | Rounak | H04L 67/32 | 709/226 |
| 2016/0198352 A1* | 7/2016 | Jarrahi Khameneh | H04L 1/1854 | 370/328 |
| 2017/0048876 A1* | 2/2017 | Mahindra | H04M 15/66 | |
| 2017/0220657 A1* | 8/2017 | Nivala | G06F 16/27 | |
| 2017/0237686 A1* | 8/2017 | Wang | H04L 47/803 | 709/219 |
| 2017/0332421 A1* | 11/2017 | Sternberg | H04W 12/0609 | |
| 2018/0041897 A1* | 2/2018 | Prasad | H04W 4/50 | |
| 2018/0091967 A1* | 3/2018 | Gupta | H04W 48/14 | |
| 2018/0227419 A1* | 8/2018 | Stojanovski | H04L 65/1016 | |
| 2018/0295498 A1* | 10/2018 | Neal | G06F 9/45558 | |

OTHER PUBLICATIONS

"System Architecture for the 5G System; Stage 2"; 3GPP TS 23.501 V1.0.0 (Jun. 2017).

"Procedures for the 5G System; Stage 2"; 3GPP TS 23.502 V0.3.0 (Mar. 2017).

* cited by examiner

METHOD AND SYSTEM FOR SUPPORTING EDGE COMPUTING

CROSS-REFERENCE TO RELATED APPLICATION

The present disclosure is related to U.S. Provisional Patent Application No. 62/514,594, entitled Method and System for Supporting Edge Computing, filed Jun. 2, 2017, the content of which is incorporated herein by reference in its entirety.

FIELD

The present disclosure relates to wireless communication networks. In particular, the present disclosure relates to an apparatus, system, and method for supporting edge computing.

BACKGROUND

In Mobile Edge Computing (MEC), applications, such as operator-controlled functions (e.g. traffic handling functions) as well as some third party functions, are deployed at or near the network edge, that is, proximate to the end user devices in a network sense. In some embodiments, a data center can be used to host radio edge processing functions along with some core network functions (such as user plane gateways) and to also serve as a data network accessible to those functions. By having the data network and the radio access or core network functions instantiated at the same data center, low latency can be provided. To support MEC for example as may be implemented in 5G networks, an Application Function (AF) request may need to be delivered to one or more Policy Control Functions (PCFs). The AF request may be related to a group of User Equipment (UEs) or the future traffic of a single UE. This leads to an issue of determining how to share AF requests among PCFs.

It is noted that applications (e.g. functions) may be operator-deployed application enablers such as HTTP accelerators or $3^{rd}$ party applications. An AF may be a non-3GPP function such as MEC orchestrator performing network function virtualization (e.g. instantiating, relocating the applications, scaling the applications in/out or up/down). An AF may interact with the network's control plane to ensure end-to-end path efficiency, for example as described in clause 5.6.7 of the $3^{rd}$ Generation Partnership Project (3GPP) document, numbered and referred to hereafter as TS 23.501 and entitled "System and Architecture for the 5G System," Jun. 1, 2017, version 1.0.0.

Further, in certain implementations of MEC, AF requests may impact future Protocol Data Unit (PDU) sessions. For example, this may be the case when the UE information in the request points to a group of UEs identified by a subscription group identifier, any UE, or a particular UE identified by External Identifier. This results in a technical issue of how to deliver the AF request to the relevant PCF, particularly when the identity of the PCF is not known at the time that the request is generated.

Document TS 23.501 specifies various operations of 5G networks that are relevant to MEC. The content of the AF request is defined in clause 5.6.7 of TS 23.501. A proposed revision of TS 23.501 as of Jun. 2, 2017 states that the AF request should be written into a storage medium and that a PCF should obtain the AF request from the storage medium when needed. However, further details, such as details of the storage medium and related operation, have not been defined.

Therefore there is a need for methods and systems for supporting edge computing that obviate or mitigate one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

In accordance with embodiments of the present disclosure, there is provided an apparatus, system, and method for supporting edge computing.

In accordance with an embodiment of the present disclosure there is provided a network function operating as a data repository. The network function is configured to store data associated with an Application Function (AF) request and at least one of user data and policy data. The AF request is associated with a User Equipment (UE) that roams from its HPLMN to a Visited Public Land Mobile Network (VPLMN), the VPLMN comprising the network function and a Policy Control Function (vPCF). The network function is further configured to transmit a notification to the vPCF that subscribes to receive the AF request, the notification indicative of the data associated with the AF request.

The network function may include further potential features either individually or in combination, for example as described below. In some embodiments, the network function is further configured to: receive data associated with the AF request from an Application Function via a Network Exposure Function (vNEF) in the VPLMN. In some embodiments, the AF request is to influence traffic routing for the UE. In some embodiments, the network function is further configured to: identify the vPCF as a subscriber to an AF request notification service, and wherein the notification is transmitted to the vPCF in response to said identifying the vPCF as the subscriber. In some embodiments, the network function is further configured to: update a previously stored version of the data associated with the AF request by the received data associated with the AF request in the data repository. In some embodiments, the network function is further configured to indicate a vNEF that the data associated with the AF request has been stored. In some embodiments, the network function is further configured, in response to a request, from the vPCF, to obtain the data associated with the AF request, to transmit the data associated with the AF request from the data repository to the vPCF. In some embodiments, the network function is further configured to transmit the notification to multiple PCFs operating in the network and including the vPCF. In some embodiments, the data associated with the AF request is stored as application data in the data repository.

In accordance with an embodiment of the present disclosure there is provided a networked computing apparatus, comprising: the network function as described above, and a Network Exposure Function (vNEF) configured to: initiate storage of data associated with the AF request in the data repository. In some embodiments, the vNEF is configured, upon receiving the AF request from the AF, to initiate storage of data associated with the AF request in the data repository.

In accordance with an embodiment of the present disclosure there is provided a method for example of operating a data repository and/or associated network function. The method may be performed automatically by a networked computing device. The method includes storing, by a data repository, data associated with an Application Function (AF) request and at least one of user data and policy data. The AF request is associated with a User Equipment (UE) that roams from its HPLMN to a Visited Public Land Mobile Network (VPLMN), the VPLMN comprising the data repository and a Policy Control Function (vPCF). The method further includes transmitting, by the data repository, a notification to the vPCF that subscribes to receive the AF request, the notification indicative of the data associated with the AF request.

The above method may include further potential features either individually or in combination, for example as described below. In some embodiments, the method further includes receiving, by the data repository, data associated with the AF request from an Application Function via a Network Exposure Function (vNEF) in the VPLMN. In some embodiments, the method further includes identifying, by the data repository, the vPCF as a subscriber to an AF request notification service, and wherein the notification is transmitted to the vPCF in response to said identifying the vPCF as the subscriber. In some embodiments, the method further includes updating, by the data repository, a previously stored version of the data associated with the AF request by the received data associated with the AF request in the data repository. In some embodiments, the AF request is to influence traffic routing for the UE. In some embodiments, the method further includes, in response to a request, from the vPCF, to obtain the data associated with the AF request, transmitting the data associated with the AF request from the data repository to the vPCF. In some embodiments, the method further includes transmitting, by the data repository, the notification to multiple PCFs operating in the network and including the vPCF. In some embodiments, the method further includes initiating, by a Network Exposure Function (vNEF), storage of data associated with the AF request in the data repository. In some embodiments, the initiation of the storage includes, upon receiving the AF request from the AF, initiating storage of data associated with the AF request in the data repository.

In accordance with an embodiment of the present disclosure there is provided an apparatus in a communication network supporting Edge Computing (EC) in respect of a User Equipment (UE) connected to a Visited Public Land Mobile Network (VPLMN). The apparatus includes a network interface, processing circuitry and a memory and operating a Network Exposure Function (vNEF) in the VPLMN. The apparatus is configured to receive, via the network interface, an Application Function (AF) request from an Application Function of the VPLMN. The UE is connected to the VPLMN is a roaming UE, and the AF request is related to the roaming UE. The apparatus is further configured to initiate, via the network interface, storage of data associated with the AF request in a data repository of the VPLMN, the data repository being configured to store user data and policy data. The apparatus is further configured to transmit, via the network interface, a notification from the data repository to a Policy Control Function (vPCF) in the VPLMN, the notification indicative of the AF request. The apparatus is further configured, in response to a request, from the vPCF, to obtain the AF request or the data associated with the AF request, transmit the data associated with the AF request from the data repository to the vPCF.

The above apparatus may include further potential features either individually or in combination, for example as described below. In some embodiments, the apparatus is further configured, in response receipt of the AF request, to perform one or both of: authentication of credentials of the Application Function; and authorization of access to or by the Application Function. In some embodiments, the apparatus is further configured to verify a UE identifier or a group identifier carried in the AF request; and when the UE identifier or the group identifier comprises a first identifier in a format other than a format used in a core network supporting the HPLMN, convert the first identifier to a corresponding second identifier which is in the format used in the core network. In some embodiments, the apparatus is further configured to transmit, via the network interface, the data associated with the AF request from the data repository to multiple PCFs operating in the network and including the vPCF. In some embodiments, the data associated with the AF request is stored as application data in the data repository. In some embodiments, the apparatus is further configured to transmit an AF request response to the Application Function. In some embodiments, the apparatus is further configured to monitor for a response from the data repository, the response indicative that the data associated with the AF request has been stored. In some embodiments, the apparatus is further configured to identify the vPCF as a subscriber to an AF request notification service, and wherein the notification is transmitted to the vPCF in response to said identifying the vPCF as the subscriber. In some embodiments, storage of the data associated with the AF request comprises updating a previously stored version of the data associated with the AF request in the data repository. In some embodiments, the data associated with the AF request is the AF request or data derived from the AF request.

In accordance with an embodiment of the present disclosure there is provided a method for supporting Edge Computing (EC) in respect of a User Equipment (UE) connected to a Visited Public Land Mobile Network (VPLMN). The method includes, by a networked computing apparatus, receiving, at a Network Exposure Function (vNEF) in the VPLMN, an Application Function (AF) request from an Application Function of the VPLMN, wherein the UE connected to the VPLMN is a roaming UE, and wherein the AF request is related to the roaming UE, the data repository being configured to store user data and policy data. The method further includes initiating, by the vNEF, storage of data associated with the AF request in a data repository in the VPLMN. The method further includes transmitting a notification from the data repository to a Policy Control Function (vPCF) in the VPLMN, the notification indicative of the AF request. The method further includes, in response to a request, from the vPCF, to obtain the AF request or the data associated with the AF request, transmitting the data associated with the AF request from the data repository to the vPCF.

The above method may include further potential features either individually or in combination, for example as described below. In some embodiments, the method further includes performing, by the vNEF and in response to the AF request, one or both of: authentication of credentials of the Application Function; and authorization of access to or by the Application Function. In some embodiments, the method further includes, by the vNEF, verifying a UE identifier or a group identifier carried in the AF request; and when the UE identifier or the group identifier comprises a first identifier in a format other than a format used in a core network supporting the HPLMN, converting the first identifier to a corresponding second identifier which is in the format used in the core network. In some embodiments, the method further includes transmitting the data associated with the AF request from the data repository to multiple PCFs operating in the network and including the vPCF. In some embodiments, the data associated with the AF request is stored as application data in the data repository. In some embodiments, the method further includes transmitting an AF request response to the Application Function. In some embodiments, the method further includes monitoring for a response from the data repository, the response indicative that the data associated with the AF request has been stored. In some embodiments, the method further includes identifying the vPCF as a subscriber to an AF request notification service, and wherein the notification is transmitted to the vPCF in response to said identifying the vPCF as the subscriber. In some embodiments, storage of the data associated with the AF request comprises updating a previously stored version of the data associated with the AF request in the data repository. In some embodiments, the data associated with the AF request is the AF request or data derived from the AF request.

In accordance with an embodiment of the present disclosure there is provided a method for supporting Edge Computing (EC), e.g. Mobile Edge Computing (MEC). The method includes receiving Application Function (AF) request data from an AF operating in the network in support of EC. The method may further include storing the request data in memory. The method further includes transmitting the request data from the memory to one or more Policy Control Functions (PCFs) operating in the network. In various embodiments, the AF requests are received, stored and transmitted by an Application Data Repository (ADR) function instantiated in the network. The method may include (and the corresponding apparatus may be configured to perform) storing the request data in memory; notifying the PCF that the request data has been stored in said memory, and transmitting the request data from the memory to the PCF in response to receipt of a request from the PCF. The method may be performed automatically, for example by a networked computing device having a computer processor operatively coupled to memory, or similar data processing components.

In accordance with another embodiment of the present disclosure there is provided an apparatus in a communication network supporting Edge Computing (EC), e.g. Mobile Edge Computing (MEC), the apparatus comprising a network interface, processing circuitry and a memory. The apparatus is configured (e.g. using an AF request data receiver) to receive, via the network interface, Application Function (AF) request data from an AF operating in the network in support of EC. The apparatus may be further configured to store the request data in the memory. The apparatus is further configured (e.g. using an AF request data provider) to transmit, via the network interface, the request data from the memory to a Policy Control Function (PCF) operating in the network, or to multiple PCFs. The apparatus may operate an Application Data Repository (ADR) function instantiated in the network.

In accordance with another embodiment of the present disclosure there is provided a method for supporting Edge Computing (EC) in respect of a User Equipment (UE) connected to a Home Public Land Mobile Network (HPLMN). The method includes receiving, at a Unified Data Management function (UDM), an Application Function (AF) request from an Application Function of the HPLMN or an Application Function (AF) request storage request from another function on behalf of the Application Function of the HPLMN. The method further includes initiating, by the UDM, storage of the AF request in an Application Data Repository (ADR) in the HPLMN. The method further includes, upon storing the AF request in the ADR, transmitting a notification from the ADR to a Policy Control Function (PCF), the notification indicative of storage of the AF request. The method further includes, upon receiving a request, from the PCF, to obtain the AF request, transmitting the AF request from the ADR to the PCF. The UDM may receive the AF storage request directly from the AF. Alternatively, a Network Exposure Function (NEF) may receive an AF request from the AF and the NEF may respond by transmitting the AF request storage request to the UDM. In some embodiments, the NEF may transmit the AF request storage request to the ADR via the UDM (or UDM-FE, where FE denotes Front End). The AF request storage request may include/indicate the AF request received from the AF.

The above method may further include performing authentication and authorization by the NEF in response to the AF request storage request or the AF request. The method may further include, by the UDM or the NEF, verifying one or both of a UE identifier and a group identifier carried in the AF request; and when one or both of the UE identifier and the group identifier comprises a first identifier in a format other than a format used in a core network supporting the HPLMN, converting the first identifier to a corresponding second identifier which is in the format used in the core network.

In accordance with another embodiment of the present disclosure there is provided a method for supporting Edge Computing (EC) in respect of a User Equipment (UE) connected to a Visited Public Land Mobile Network (VPLMN). The method includes receiving, at a Network Exposure Function (vNEF) in the VPLMN, an Application Function (AF) request from or on behalf of an Application Function of the VPLMN. The method further includes initiating, by the vNEF, storage of the AF request in an Application Data Repository (vADR) in the VPLMN. The method further includes, upon storing the AF request in the vADR, transmitting a notification from the vADR to a Policy Control Function (vPCF) in the VPLMN, the notification indicative of storage of the AF request. The method further includes, upon receiving a request, from the vPCF, to obtain the AF request, transmitting the AF request from the vADR to the vPCF.

Alternatively to the AF being stored in the vADR, data associated with the AF request can be stored in the vADR. Alternatively to storage in the vADR, the AF request or associated data can be stored in another data repository, such as a Unified Data Repository (e.g. holding at least application data.) The AF request or associated data may be stored as application data. In some embodiments, the data repository is configured at least to store user data and policy data. The notification may alternatively be indicative of the AF request, storage of data associated with the AF request, or data carried in the AF request. The request from the vPCF may alternatively be a request to obtain the stored data, and the stored data can be transmitted in response thereto.

The above method may further include performing authentication and authorization by the vNEF in response to the AF request storage request or the AF request. The method may further include: transmitting one or both of a UE identification request and a group identification request from the vNEF to a Network Exposure Function (hNEF) of a Home Public Land Mobile Network (HPLMN) of the UE;

and receiving one or both of a UE identification response and a group identification response from the hNEF in response to one or both of the UE identification request and the group identification request. The method may further include, by the vNEF, verifying one or both of a UE identifier and a group identifier carried in the AF request; and when one or both of the UE identifier and the group identifier comprises a first identifier in a format other than a format used in a core network supporting the HPLMN or the VPLMN, converting the first identifier to a corresponding second identifier which is in the format used in the core network.

In accordance with an embodiment of the present disclosure there is provided an apparatus in a communication network supporting Edge Computing (EC) in respect of a User Equipment (UE) connected to a Visited Public Land Mobile Network (VPLMN). The apparatus includes a network interface, processing circuitry and a memory. The apparatus operates a Network Exposure Function (vNEF) in the VPLMN. The apparatus is configured to receive, via the network interface, Application Function (AF) request data from an Application Function of the VPLMN. The apparatus is configured to initiate, via the network interface, storage of data associated with the AF request in a data repository of the VPLMN. In some embodiments, the data repository is configured to store user data and policy data. The apparatus is configured to transmit, via the network interface, a notification from the data repository to a Policy Control Function (vPCF) in the VPLMN, the notification indicative of the AF request. The apparatus is configured, in response to a request, from the vPCF, to obtain the data associated with the AF request, and transmit the data associated with the AF request from the data repository to the vPCF.

Systems comprising a plurality of operatively coupled network nodes or functions and implementing the above methods may also be provided.

BRIEF DESCRIPTION OF THE FIGURES

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
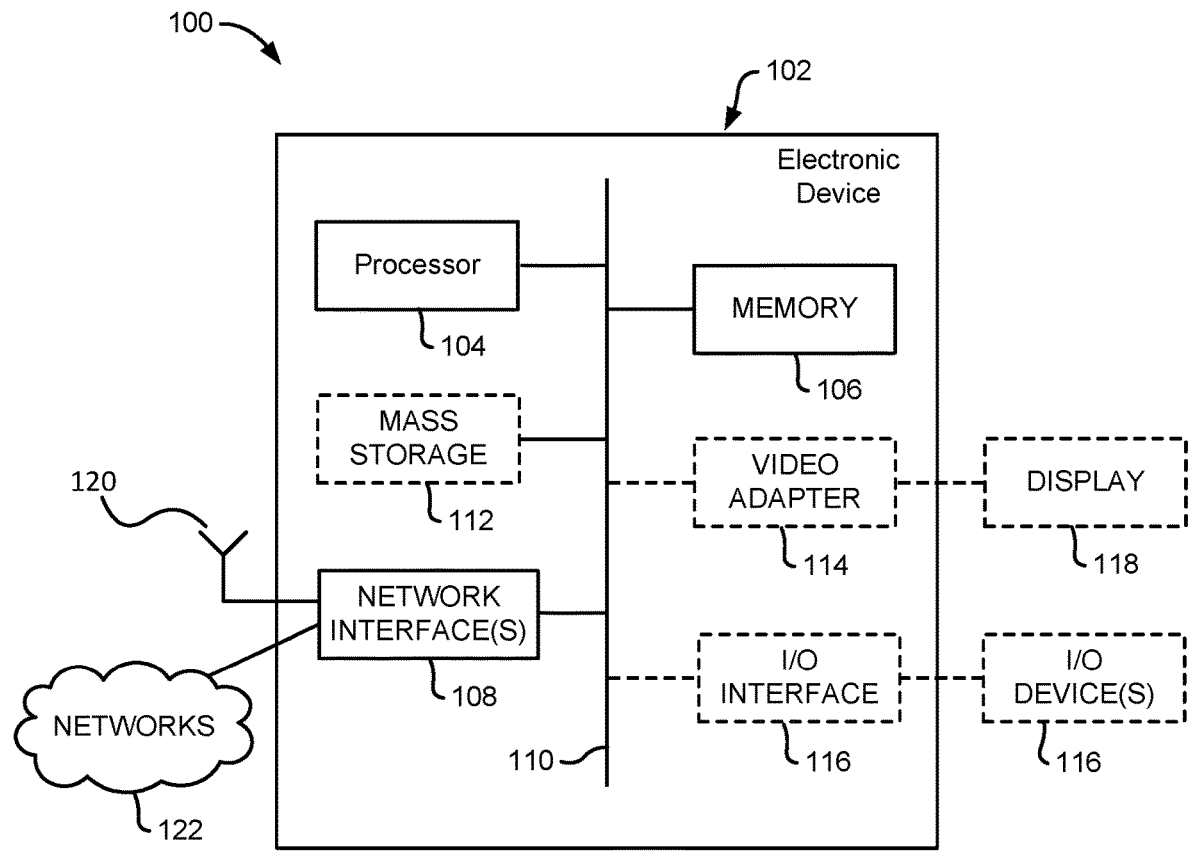
FIG. 1 is a block diagram of an electronic device 102 within a computing and communications environment 100 that may be used for implementing devices and methods in accordance with representative embodiments of the present disclosure.

There is a need to for methods and systems which allow AF requests to be effectively and efficiently shared among PCFs, particularly in the context of MEC. The AF request may relate to a group of UEs or to the future traffic of a single UE. One approach for addressing this issue is to write the relevant data (e.g. AF request data) into shared storage (e.g. volatile computer memory) that can be accessed by the relevant entities or functions requiring the data (e.g. PCFs). Each applicable PCF may then subscribe to data change notifications indicative that data in the shared storage has changed. Upon registering a data change, notifications are sent to the subscribing PCFs. Upon receiving a notification, a subscribing PCF obtains the relevant data from the storage. As such, AF requests are buffered inside the network, and subsequently provided to (e.g. retrieved by) and used by PCFs. It should be understood that although reference is commonly made to actions taken by an AF, an application (or application server) outside the 3GPP network can perform the same functions through interaction with the NEF. In such cases, the NEF may act as a proxy between the application server (or an application which may be resident on an application server) and the network functions in the 3GPP network.

Embodiments of the present disclosure relate to a method, apparatus, and system comprising a particular network location in which AF requests are stored, and one or both of an associated storage medium and an associated storage function. In particular, embodiments of the present disclosure relate to a method and apparatus for delivering AF requests to multiple PCFs serving a group of UEs or to a PCF serving a future PDU session (e.g. of a single UE or of a UE in a certain UE group). In various embodiments, the AF request is written (e.g. by a Network Exposure Function (NEF)) into an Application Data Repository (ADR), which may be a function, network device or network node, and which comprises a computer memory. The "writing" of an application request into an ADR may comprise an AF transmitting a request for the ADR to store a data set. This request may be transmitted to the ADR via the NEF. The writing or data storage can be performed via Unified Data Management (UDM). A PCF may then obtain (e.g. retrieve) the AF request (e.g. directly) from the ADR. In some embodiments, a PCF may obtain the AF request from the ADR via a data retrieval request sent to the UDM. Various embodiments of the present disclosure therefore provide for one or more of: an ADR, an ADR function, an interface between the ADR function and other network functions, and operation of the ADR function, as described herein via call flows, for example as illustrated in the various figures. Some such embodiments cause the UDM and the policy framework to facilitate MEC operation.

In other embodiments, the AF request is stored in a Structured Data Storage Function (SDSF). The AF request may be written by the NEF into the SDSF, and the PCF may obtain the AF request from the SDSF also via the NEF. In some embodiments, the PCF may obtain the AF request from the SDSF directly.

In other embodiments, the AF request is stored in a User Data Repository (UDR). The AF request may be written by the NEF into the UDR via UDM, and the PCF may obtain the AF request from the UDR directly or via UDM. However, it is noted that, as of Jun. 2, 2017, the UDR was only envisioned in standards to exist in the Home Public Land Mobile Network (HPLMN), as opposed to the Visited Public Land Mobile Network (VPLMN).

In various embodiments (referring now primarily to use of ADR), the AF request includes UE information, which indicates groups of UEs, individual UEs, or both. When the AF request is related to future PDU sessions of the UE(s), the UE information may be in the form of a Group External Identifier, or a UE External Identifier, or both. A Group External Identifier refers to the UEs in a subscription group. The group membership information is stored in UDM (or UDR).

In some embodiments, the UDM manages a data repository, which stores two categories of data: user data and application data, and UDR and ADR then represent the two data categories in UDM respectively. The user data includes user subscription information and is UE-specific. The application data is application specific; it may be at a per-application level, a per DN level, or a per application per DN level. In some embodiments, subscription profile information (e.g. the information stored in the SPR (Subscription Profile Repository) in the EPS (Evolved Packet System)) is stored in UDR. In some embodiments, subscription profile information is stored in the ADR.

The AF may provide policy requirements that apply to future PDU sessions (which, for example, belong to group of UE(s) defined by subscription or to any UE) and hence may apply to multiple PCF. Application Function influence on traffic routing, as described in clause 5.6.7 of TS 23.501, is an example of such requirement. In such a case, the policy requirements are stored in a storage as described in clause 6.3.7.2 of TS 23.501 so that they can accessed by the interested PCF(s) in the future, when the impacted PDU sessions arrive.

In some embodiments, in the illustrated proposed 5G Core Network (5GC) architecture, either or both of the UDR and SDSF may be used for storing the policy requirements. However, according to the currently agreed upon architecture, the UDR that stores data associated with a particular ED, or UE, resides only in the HPLMN associated with the UE. This may create a situation in which it is difficult to access the stored data when the AF accessed by the UE is in the VPLMN. Also as currently envisioned, SDSF is directly accessible only by the NEF, and use of the SDSF may make the PCF's access to the data less efficient. Embodiments of the present disclosure therefore provide an alternative, potentially more access-efficient and roaming-suitable storage function.

Embodiments of the present disclosure provide for a storage function termed ADR (Application Data Repository). In various embodiments, the ADR can be accessed directly by UDM, PCF and NEF. The ADR can reside in both HPLMN and VPLMN. When the AF is in the HPLMN, the AF request may be stored into the ADR via the UDM. When the AF is in the VPLMN, the AF request may be stored into the ADR via the NEF.

In various embodiments, to support authentication and authorization (e.g. actions 1002 and 1202 in FIGS. 10 and 12), the ADR stores application and AF-Service registration data, including registration identifiers (e.g. AF-Service-identifier, application identifier), security credentials, DN related registration data and slice related registration data. The UDM-FE accesses application information stored in the ADR and supports Authentication Credential Processing and Access Authorization. The NEF interacts with the AUSF for authenticating and authorizing AF requests. The NEF can provide the AF identity information to the AUSF, if the information is provided by the AF as part of AF request; it can also indicate the AF request type to the AUSF. The AUSF in turn interacts with UDM to perform authentication and authorization using the information provided by the NEF. If the AF identify information is not provided by the NEF, the AUSF may interact with the AF to obtain the AF identity information; for this reason, the NEF may provide transport information (e.g. IP address, port number) of the AF to the AUSF. The AUSF returns authentication and authorization result to the NEF.

Embodiments of the present disclosure relate to providing policy requirements that apply to future PDU sessions. An authorized Application Function (or application as the case may be) may, via the visited NEF if the AF is in the VPLMN or via the UDM if the AF is in the HPLMN, provide policy requirements (e.g. in the form of AF request) that apply to future PDU sessions (which, for example, belong to group of UE(s) defined by subscription or to any UE) and hence may apply to multiple PCFs. Application Function influence on traffic routing is an example of such a requirement. The NEF or the UDM, after relevant validation of the application or AF request (and possible parameter mapping) stores the request from the AF (or data associated with or derived from the AF request) into the ADR. The parameter mapping may include mapping a UE External Identifier to a Subscriber Permanent Identifier (SUPI). One example format of SUPI is an IMSI (International Mobile Subscriber Identify). PCF(s) that need to receive application or AF requests that target one or both of: a Data Network Name (DNN) (and slice); and a group of UEs, subscribed to receive notifications from the ADR about such application requests. The NEF or the UDM associates the request with information allowing for later modification and deletion of the application request. When the request targets Protocol Data Unit (PDU) sessions established by "any UE", the NEF or UDM associates the request with the DNN and slicing information target of the application or AF request. When the request targets PDU sessions established by UE within a predefined/subscribed "group of UEs", the NEF or UDM associates the request with the DNN, the slicing information and the group of UE target of the application request. All PCF that serve the DNN and slicing information are triggered by this policy modification induced by the AF request and take it into account for existing and future PDU sessions that match the policy change. In case of existing PDU sessions the change of policy may trigger an N7 rule change from the PCF to the SMF (Session Management Function). In some embodiments, the N7 rule change may be a PCC rule change. That is, the change of policy may trigger a PCC rule change.

According to embodiments of the present disclosure, the Policy function (PCF) is configured to implement a Front End to access application information relevant for policy decisions in an Application Data Repository (ADR). This is in addition to the following functionality: supporting unified policy framework to govern network behavior; providing policy rules to Control Plane function(s) to enforce them; and implementing a Front End to access subscription information relevant for policy decisions in a User Data Repository (UDR).

According to embodiments of the present disclosure, the Network Exposure Function (NEF) is also configured to implement a Front End to access application information relevant for policy requirements in an Application Data Repository (ADR). For example, the NEF may be configured to implement a front end configured to provide user or device access to application information. This is in addition to the following functionality: providing a means to securely expose the services and capabilities provided by 3GPP network functions for e.g. 3rd party, internal exposure/re-exposure, Application Functions, Edge Computing; and receiving information from other network functions (based on exposed capabilities of other network functions). It (e.g. the NEF) may store the received information as structured data using a standardized interface to a data storage network function (interface to be defined by 3GPP). The stored information can be "re-exposed" by the NEF to other network functions and Application Functions, and used for other purposes such as analytics.

According to embodiments of the present disclosure, the Unified Data Management (UDM) includes two parts, i.e. the application front end (FE) and the data repositories, which include the User Data Repository (UDR) and the Application Data Repository (ADR). Some or all of the following front ends are included. A UDM Front End (UDM FE) which is in charge of processing of credentials, location management, subscription management, etc. may be included. A PCF which is in charge of Policy Control as defined in subclause 6.2.4 of TS 23.501 may be included. The PCF may be a standalone network function in the overall 5$^{th}$ Generation Core Network or 5G Core Network (5GC) architecture and thus it is not necessarily part of UDM. However, the PCF may request and provide policy subscription information to UDR, and for this reason can be illustrated and described as being in the UDM architecture for purposes of description. A NEF which is in charge of Network Exposure as defined in subclause 6.2.5 of TS 23.501 may be included. The NEF may be a standalone network function in the overall 5GC architecture and thus it is not necessarily part of UDM. However, the NEF may request and provide application information to ADR, and for this reason can be illustrated and described as being in the UDM architecture for purposes of description, e.g. as described below with respect to FIG. 5A.

In various embodiments, a front end implements application logic and does not require an internal user data storage. Several different front ends may serve the same user in different transactions. The interaction between UDM and Home Subscriber Server (HSS) may be implementation specific.

Further according to various embodiments, The ADR stores application profiles required for functionalities provided by UDM-FE, PCF and NEF. The data stored in the ADR includes application, AF, and AF-Service registration data, including registration identifiers (e.g. AF-Service-identifier, application identifier), security credentials (e.g. related to the AF), DN related registration data and slice related registration data. The data stored in the ADR includes AF request for influencing traffic routing as defined in clause 5.6.7 of TS 23.501. The data stored in the ADR may further include other information related to one or both of the DN and the AF, which may be configured by a management plane function such as the Network Manager function or provisioned by the AF through the UDM or the NEF. The Packet Flow Description Function (PFDF) may be part of the ADR, in which case the ADR may behave as the PFDF and the SMF may interact with the PFDF (i.e. the ADR) directly or through UDM (or UDM FE) or through the PCF.

The AF-Service registration data may refer to the association between a service and an AF. This may be indicated, for example, by the AF-Service-identifier. A service may refer to the network service that the AF is associated to. The service may be related to a Data Network and a network slice. For example, the service may provide connectivity to the DN via the network slice.

In various embodiments, the UDM-FE accesses application information stored in an Application Data Repository (ADR) and supports Authentication Credential Processing and Access Authorization, and in some embodiments also supports User Identification Handling.

In various embodiments, the Nxx/Nadr reference point/interface are defined for the front ends to read, update (including add, modify), delete, subscribe to notification of data changes and notify the data changes from the ADR. The Nxx is the name of the P2P reference point, and the Nadr is the name of the service based interface. Both the front ends (FEs) and the ADR can be located in the VPLMN. The ADR can be collocated with the UDR, the SDSF, the UDSF, or the PFDF. The ADR may be instantiated using a logical function which is potentially collocated with other storage functions (e.g. instantiated partially or fully using the same or collocated physical components).

In various embodiments, the SDSF (or the USDSF, or both) may be instantiated as part of the ADR, in which case the interfaces between the SDSF (or the USDSF, or both) and other network functions may be incorporated with the interface of the ADR.

According to embodiments of the present disclosure, the PCF is configured to implement a Front End to access application information relevant for policy decisions in an Application Data Repository (ADR) including dynamic profile updates pushed by the AF for influencing traffic routing.

In various embodiments, the term "Application Function" may refer to the function (e.g. as formally defined by the 3$^{rd}$ Generation Partnership Project (3GPP)) that interacts with 3GPP control plane functions to provide policy requirements that are application-specific. The "Application Function" may be located outside the 3GPP domain, e.g. inside the Data Network. The Application Function may be integrated with or separate from other applications (which may also be functions and may also be located outside of the 3GPP domain) that handle user plane traffic, e.g. an application server. Such other applications may be software functions or functionalities provided by a third party application. An Application Function that is outside the 3GPP domain may be within the operator controlled network, or it may be resident outside the operator controlled network. In one such example an application server can be instantiated in the data network, and an application resident on the instantiated application server may communicate with control plane functions in the 3GPP domain through an interaction with the NEF.

FIG. 1 is a block diagram of an electronic device (ED) 102 illustrated within a computing and communications environment 100 that may be used for implementing the devices and methods disclosed herein. In some embodiments, the electronic device may be an element of communications network infrastructure, such as a base station (for example a NodeB, an enhanced Node B (eNodeB), a next generation NodeB (sometimes referred to as a gNodeB or gNB), a home subscriber server (HSS), a gateway (GW) such as a packet gateway (PGW) or a serving gateway (SGW) or various other nodes or functions within an evolved packet core (EPC) network. In other embodiments, the electronic device may be a device that connects to network infrastructure over a radio interface, such as a mobile phone, smart phone or other such device that may be classified as a User Equipment (UE). In some embodiments, ED 102 may be a Machine Type Communications (MTC) device (also referred to as a machine-to-machine (m2m) device), or another such device that may be categorized as a UE despite not providing a direct service to a user. In some references, an ED may also be referred to as a mobile device, a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The electronic device 102 typically includes a processor 104, such as a Central Processing Unit (CPU), and may further include specialized processors such as a Graphics Processing Unit (GPU) or other such processor, a memory 106, a network interface 108 and a bus 110 to connect the components of ED 102. ED 102 may optionally also include components such as a mass storage device 112, a video adapter 114, and an I/O interface 116 (shown in dashed lines).

The memory 106 may comprise any type of non-transitory system memory, readable by the processor 104, such as static random access memory (SRAM), dynamic random access memory (DRAM), synchronous DRAM (SDRAM), read-only memory (ROM), or a combination thereof. In an embodiment, the memory 106 may include more than one type of memory, such as ROM for use at boot-up, and DRAM for program and data storage for use while executing programs. The bus 110 may be one or more of any type of several bus architectures including a memory bus or memory controller, a peripheral bus, or a video bus.

The electronic device 102 may also include one or more network interfaces 108, which may include at least one of a wired network interface and a wireless network interface. As illustrated in FIG. 1, network interface 108 may include a wired network interface to connect to a network 122, and also may include a radio access network interface 120 for connecting to other devices over a radio link. When ED 102 is network infrastructure, the radio access network interface 120 may be omitted for nodes or functions acting as elements of the Core Network (CN) other than those at the radio edge (e.g. an eNB). When ED 102 is infrastructure at the radio edge of a network, both wired and wireless network interfaces may be included. When ED 102 is a wirelessly connected device, such as a User Equipment, radio access network interface 120 may be present and it may be supplemented by other wireless interfaces such as WiFi network interfaces. The network interfaces 108 allow the electronic device 102 to communicate with remote entities such as those connected to network 122.

The mass storage 112 may comprise any type of non-transitory storage device configured to store data, programs, and other information and to make the data, programs, and other information accessible via the bus 110. The mass storage 112 may comprise, for example, one or more of a solid state drive, hard disk drive, a magnetic disk drive, or an optical disk drive. In some embodiments, mass storage 104 may be remote to the electronic device 102 and accessible through use of a network interface such as interface 108. In the illustrated embodiment, mass storage 112 is distinct from memory 106 where it is included, and may generally perform storage tasks compatible with higher latency, but may generally provide lesser or no volatility. In some embodiments, mass storage 112 may be integrated with a heterogeneous memory 106.

The optional video adapter 114 and the I/O interface 116 (shown in dashed lines) provide interfaces to couple the electronic device 102 to external input and output devices. Examples of input and output devices include a display 118 coupled to the video adapter 110 and an I/O device 116 such as a touch-screen coupled to the I/O interface 112. Other devices may be coupled to the electronic device 102, and additional or fewer interfaces may be utilized. For example, a serial interface such as Universal Serial Bus (USB) (not shown) may be used to provide an interface for an external device. Those skilled in the art will appreciate that in embodiments in which ED 102 is part of a data center, I/O interface 116 and Video Adapter 114 may be virtualized and provided through network interface 108.

In some embodiments, electronic device 102 may be a standalone device, while in other embodiments, electronic device 102 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

Figure 2:
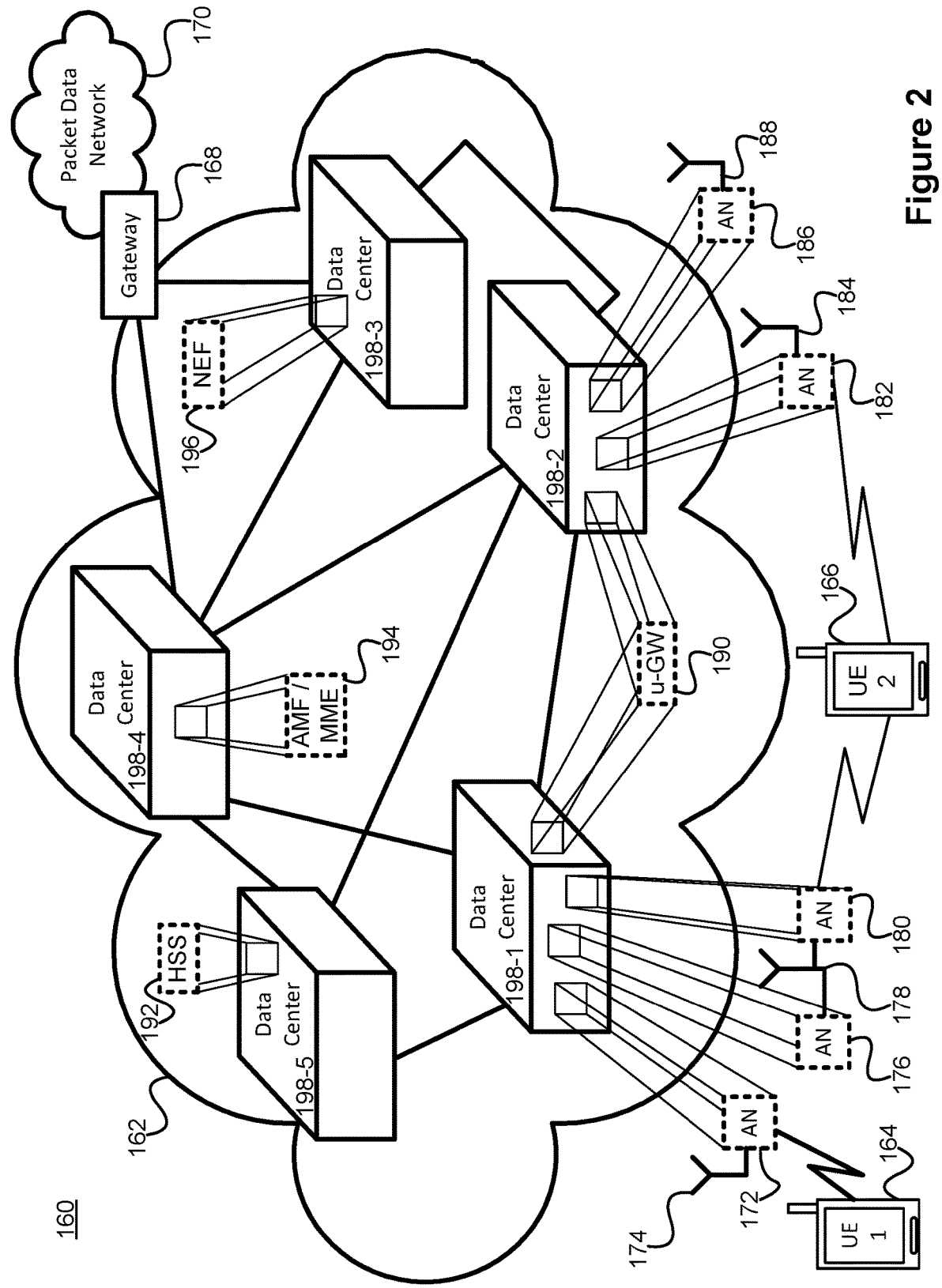
FIG. 2 is a diagram illustrating a cloud-based implementation of a Core Network and Radio Access Network using virtualized functions.

FIG. 2 illustrates a system 160 in which a core/RAN network 162 provides radio access and core network services to electronic devices such as UE1 164 and UE2 166. Traffic from electronic devices can be routed through network functions, to a gateway 168 that provides access to a packet data network 170 such as the Internet. Radio access services are typically provided by a RAN, which in this illustration is provided as a Cloud-RAN (C-RAN). Where a conventional RAN architecture was designed to be composed of discrete elements, such as eNodeBs, that were connected to the Core Network through a backhaul network, a C-RAN takes advantage of function virtualization to virtualize the Access Nodes of the network. Much as a physical Access Node, such as an eNodeB, was connected to an antenna by a front haul link, in the illustrated embodiment of a C-RAN Access Nodes are connected to antenna (or to a remote radio head (RRH)) through a front haul connection, but are functions that are instantiated upon compute resources in network 162. For example, UE1 164 is connected to the network through AN 172, which can provide radio access services through antenna 174. AN 172 is instantiated upon the compute and storage resources provided by a data center, in this case data center 198-1. Similarly, AN 176 and 180, which are connected to the same set of antennae 178, are also instantiated upon the resources of data center 198-1. AN 180 provides radio access services to UE 2 166, which also makes use of the access services provided by AN 182. AN 182 is connected to antenna 184, and is instantiated upon the resources of data center 198-2. AN 186 is connected to antenna 188, and is also instantiated upon the resources of data center 198-2. It should be understood that the fronthaul connections linking the virtualized access nodes to the antennas or RRHs, may be direct connections, or they may form a fronthaul network. The integration of a CRAN into a core network may obviate or reduce the concerns associated with backhaul connections as the AN functions may be co-located with CN functions. As such, Data Center 198-1 also serves as a location at which a user-specific gateway function (u-GW) 190 is instantiated. This function is also instantiated in data center 198-2. Having a function instantiated at more than one data center may be part of a function migration process in which the function is moved through the network, or one of the instantiations may be an intentionally redundant instantiation. Both functions can be instantiated and configured, with only one of them active at a time, or they may both be active, but only one of them may be transmitting data to the UE. In other embodiments, such as those focused on Ultra-Reliable connections, such as Ultra-Reliable Low Latency Communications (URLLC), both functions may be active and transmitting data to (or receiving data from) an ED such as UE2 166. Network functions such as a Home Subscriber Server (HSS) 192, an Access and Mobility Management Function (AMF) 194 or its predecessor Mobility Management Entity (MME), and a Network Exposure Function (NEF) 196 are shown as being instantiated on the resources of Data Center 198-5, 198-4 and 198-3 respectively.

The virtualization of the network functions allows a function to be located in the network at a location topologically close to the demand for the service provided by the function. Thus, AN 172, which is associated with antenna 174, can be instantiated upon data center resources at the data center closest to the antenna 174, in this case data center 198-1. Functions such as an NEF 196, which may not need to be close to ANs, may be instantiated further away (in either or both of a topological or physical sense). Thus, NEF 196 is instantiated at data center 198-3, and the HSS 192 and AMF 194 are instantiated at data centers 198-5 and 198-4 respectively, which are topologically closer to the radio edge of the network 162. In some network implementations, data centers can be arranged hierarchically and different functions can be placed at different levels in the hierarchy.

Figure 3:
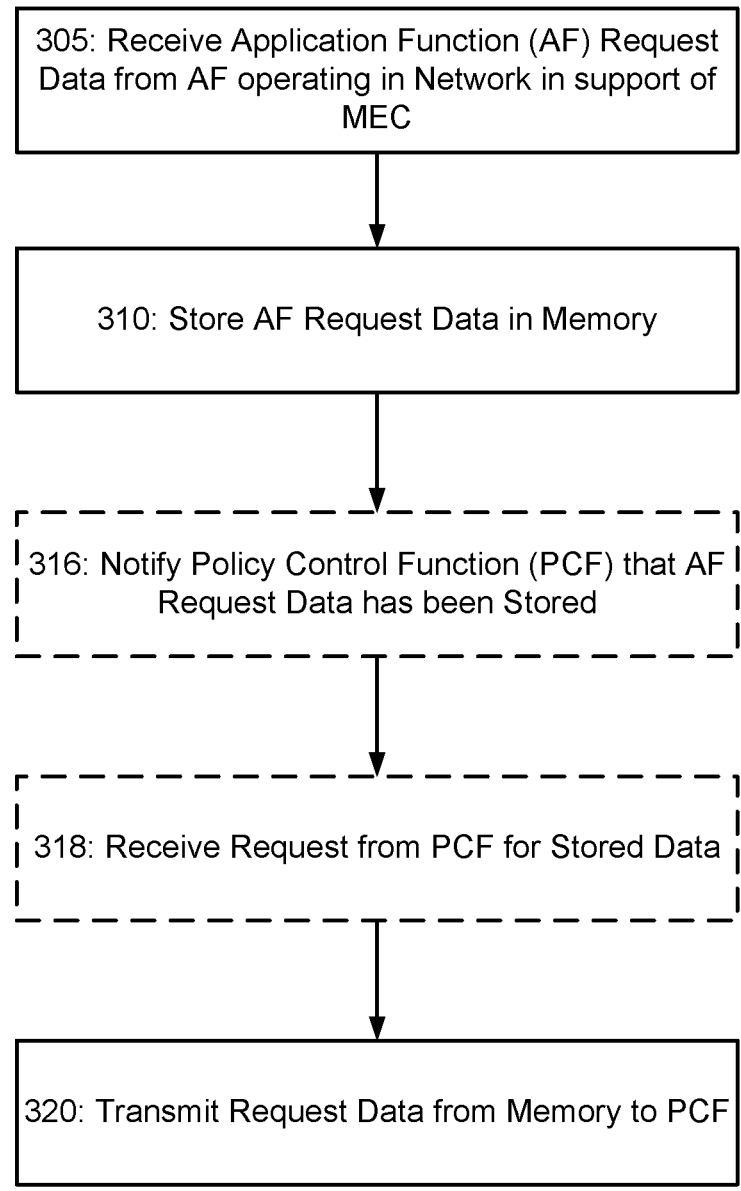
FIG. 3 illustrates a method for supporting MEC in accordance with an embodiment of the present disclosure.

FIG. 3 illustrates a method 300 for supporting Mobile Edge Computing (MEC) according to an embodiment of the present disclosure. The method includes receiving 305 Application Function (AF) request data from an AF operating in the network in support of MEC. The method further includes storing 310 the request data in memory. The memory may correspond to an ADR, UDR, SDSF, or UDSF, or other node, function or apparatus capable of storing the information in memory and performing associated operations. In particular embodiments, the memory corresponds to the ADR. In various embodiments, the ADR is separate from the UDR, SDSF and UDSF and has a different accessibility profile from these functions. For example, the ADR may be directly communicatively coupled via network interfaces to a different set of nodes (or functions, or both nodes and functions) than the UDR, SDSF and UDSF.

The method further includes transmitting 320 the request data from the memory to one or a plurality of Policy Control Functions (PCFs) operating in the network. The transmission may be performed immediately, at a later time (but in a timely manner), multiple times, repeatedly, periodically, etc. The method may optionally comprise notifying 316 a PCF that the request data has been stored in memory, and receiving 318 a request for the stored data from the PCF (so that transmitting the request data from the memory to the PCF is performed in response to receipt of a request from the PCF). The request data may be transmitted multiple times in response to multiple requests from different PCFs.

Figure 4:
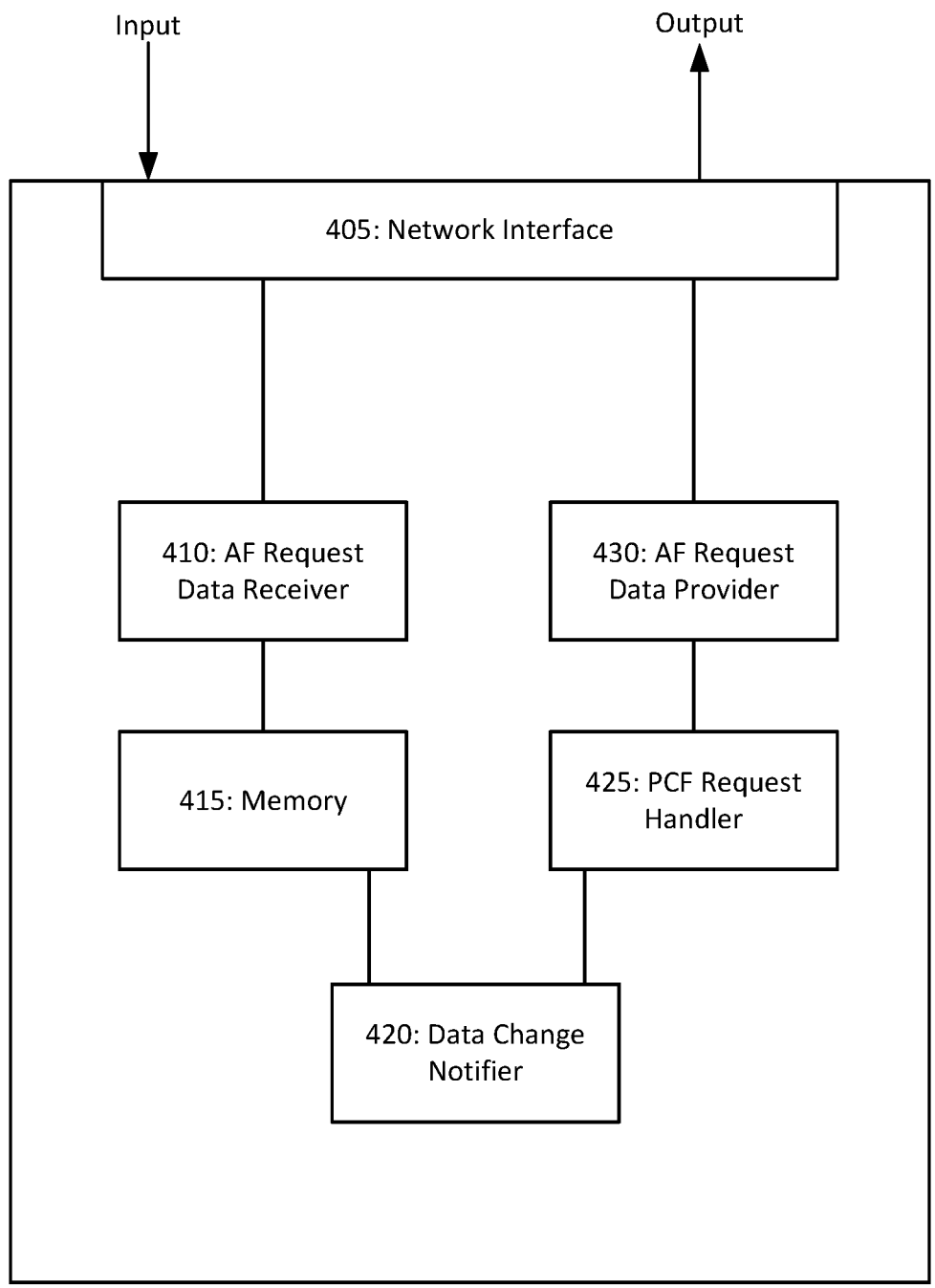
FIG. 4 illustrates an apparatus in a communication network supporting MEC in accordance with an embodiment of the present disclosure.

FIG. 4 illustrates an apparatus 400 in a communication network supporting Mobile Edge Computing (MEC), according to an embodiment of the present disclosure. The apparatus includes a network interface 405, processing circuitry and a memory. The apparatus may support a network function, for example using network function virtualization. The apparatus includes an AF request data receiver 410 configured to receive, via the network interface, Application Function (AF) request data from an AF operating in the network in support of MEC. The apparatus includes a memory 415 configured to store the request data. The apparatus further includes an AF request data provider 430 configured to transmit, via the network interface, the request data from the memory to a Policy Control Functions (PCF) operating in the network. The apparatus may further include a data change notifier 420 configured to notify, via the network interface, one or more (e.g. subscribing) PCFs that new request data has been stored in memory, and a PCF request handler 425 configured to receive requests for AF data from PCFs and to trigger the AF request data provider 430 to transmit the request data to a requesting PCF in response to receipt of such a request for AF data. Referring to FIG. 1, the AF request data receiver 410, data change notifier 420, PCF request handler 425 and AF request data provider 430 may be implemented using the processor 104 executing program instructions stored in the memory 106 or mass storage 112.

Figure 5A:
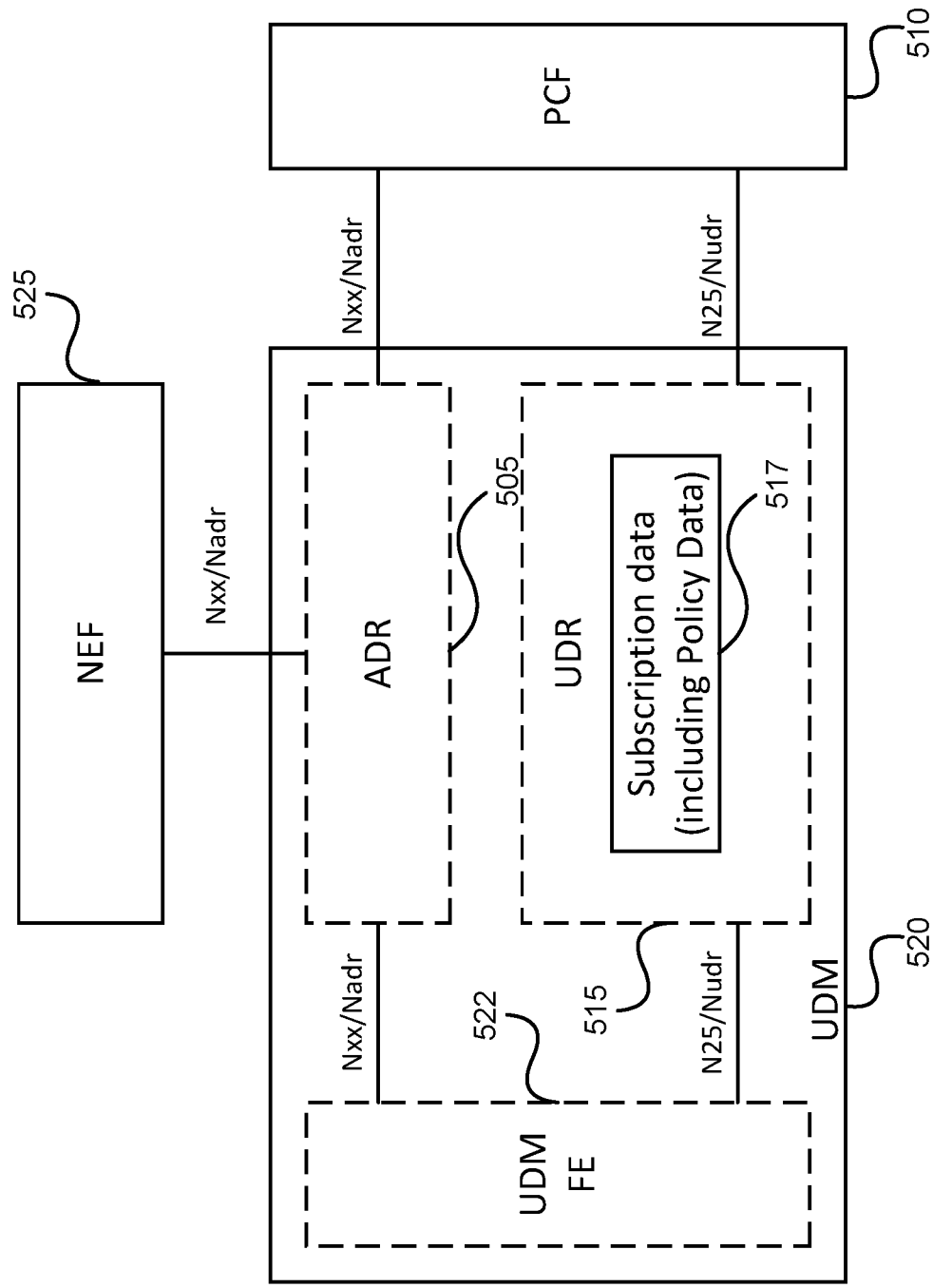
FIGS. 5A and 5B illustrates interoperation between various functional elements of a 5G network, in accordance with an embodiment of the present disclosure.
Figure 5B:
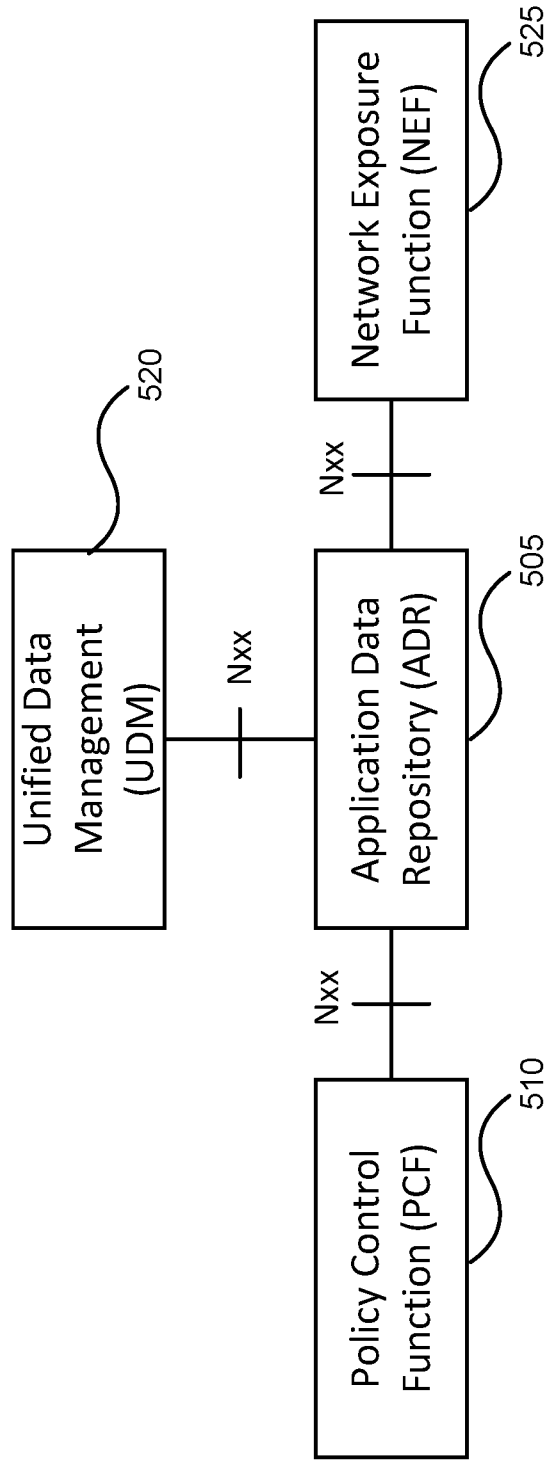

FIGS. 5A and 5B illustrate interoperation between various functional elements of a 5G network, in accordance with an embodiment of the present disclosure. The ADR 505 is instantiated in the network, for example as an independent function. Application data may in some embodiments be defined as a new category of data to be stored in the ADR 505. The ADR 505 receives and stores application data such as AF requests in edge computing scenarios. In various embodiments, the ADR 505 resides in both the HPLMN and the VPLMN. As also illustrated, the PCF 510 is coupled to the ADR 505 via a direct interface and is configured to receive data notifications from the ADR 505, indicative of newly received and stored AF requests. The configuration may be a subscription configuration as described below. The PCF 510 may also be directly coupled with a UDR 515 holding subscription data 517, including policy data.

In some embodiments, the ADR 505 is configured to receive and store a list of subscriber PCFs, and to transmit notifications to the subscriber PCFs in response to receipt and storage of an AF request or application data changes relevant to operation of the PCFs (e.g. specified by the PCFs during subscription or as part of configuration). PCFs (or functions operating on their behalf) can transmit a request to the ADR to be added to (or removed from) the subscriber list. Further, PCFs can be configured, upon receipt of a notification, to transmit a request for newly received and stored AF request information or updated application data. The ADR 505 can be configured to respond to such requests by transmitting the requested information to the requesting PCF 510. The ADR 505 or another entity may maintain the list of subscriber PCFs, for example by receiving notifications to add or remove subscriber PCFs from the list.

FIG. 5A further illustrates a UDM Front End (UDM FE) 522 and an NEF 525, both of which are coupled to the ADR 505 via direct interfaces. As such, both the UDM 520 (or UDM-FE 522) and the NEF 525 can interact with the ADR 505 directly. In some embodiments, for an AF residing in the HPLMN, AF requests are stored into the ADR 505 via the UDM 520 (or UDM-FE 522). In some embodiments, for an AF residing in the VPLMN, AF requests are stored into the visited (from the UE perspective) ADR via the visited NEF. HPLMN and VPLMN are defined from the perspective of a UE under consideration (i.e. the UE is a subscriber to the PLMN that is considered as the HPLMN and is not a subscriber to the PLMN that is considered as the VPLMN, and this is indicated in the UE information in the AF request). As such, the AF does not necessarily distinguish that it is in the VPLMN, but rather is local to the PLMN that is viewed here as the VPLMN. The UDM FE 522 may also be directly coupled to the UDR 515. The ADR 505, UDR 515, and UDM FE 522 are illustrated as belonging to the UDM 520, although one or more of these may be provided as independent functions.

In some embodiments, the ADR 505 resides functionally within the UDM 520, or is managed by the UDM 520, or is both within and managed by the UDM 520. In some alternative embodiments, the NEF 525 writes AF requests into the ADR 505 via the UDM 520.

FIG. 5B illustrates the (e.g. direct) interconnection of the ADR 505 with the UDM 520, the PCF 510, and the NEF 525, respectively, according to an embodiment of the present disclosure.

Figure 6A:
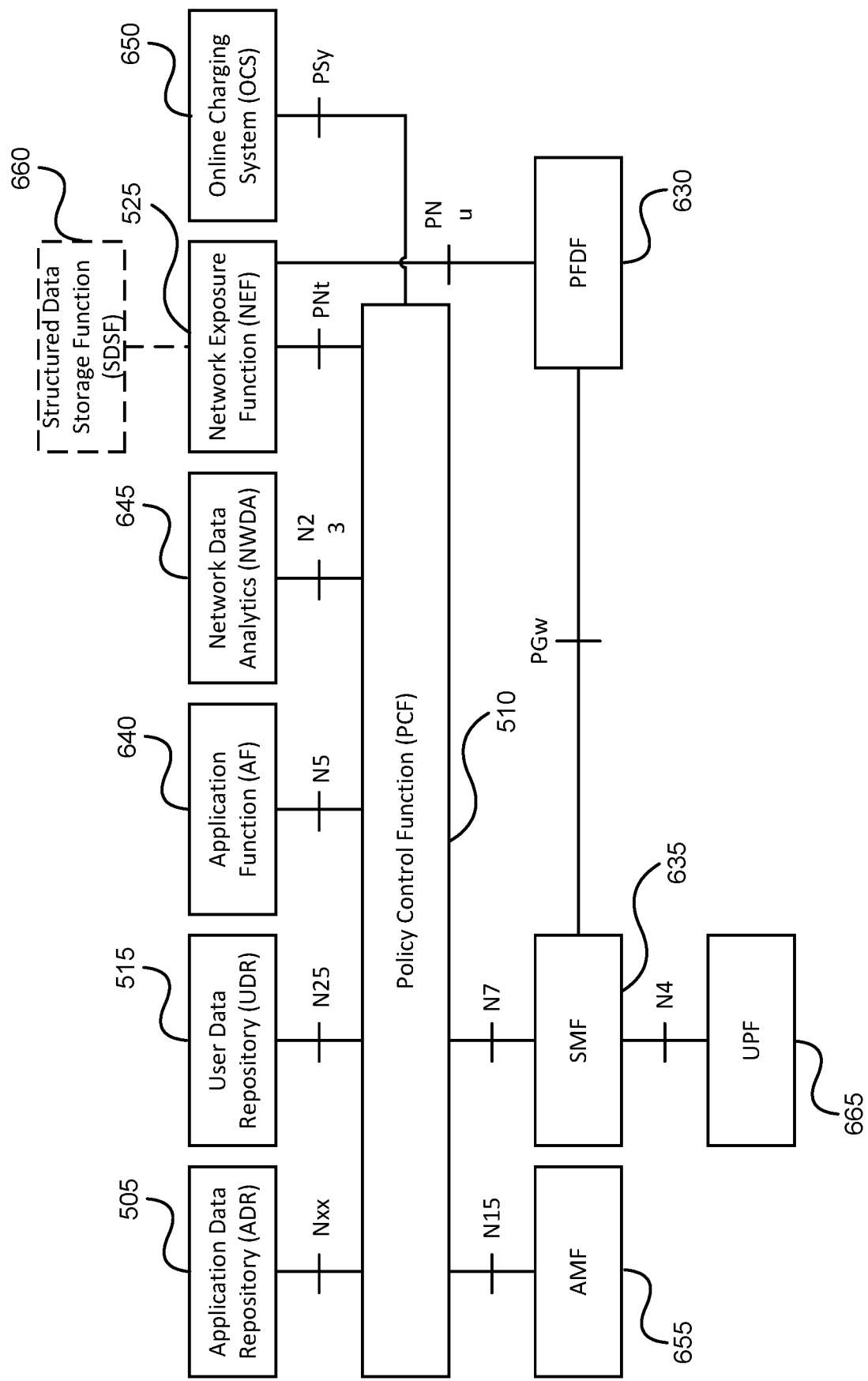
FIG. 6A illustrates, in further detail, interoperation between various functional elements of a 5G network including the ADR, in accordance with an embodiment of the present disclosure.

FIG. 6A illustrates, in further detail, interoperation between various functional elements of a 5G network including the ADR, in accordance with an embodiment of the present disclosure. In particular, FIG. 6A applies to a non-roaming scenario for a 5G network, e.g. in association with a 5G policy framework architecture. As illustrated, the ADR 505 is coupled to the PCF 510 via an interface (Nxx), such as a direct interface.

In some embodiments with respect to FIG. 6A, the PFDF 630 (Packet Flow Description Function) is part of, or co-located with the ADR 505, and the NEF 525 and the SMF 635 access the data in PFDF 630 via the UDM (not shown in FIG. 6A). In some embodiments, the ADR-to-PCF interface (Nxx) may correspond to the Ud interface in the PCC (Policy Control and Charging) framework in the EPS. In some embodiments, the UDR-to-PCF interface (N25) may correspond to the Sp interface in the PCC framework in the EPS.

In more detail, FIG. 6A illustrates the PCF 510 coupled to the following nodes or functions: the ADR 505; UDR 515; AF 640; Network Data Analytics (NWDA) 645; NEF 525; Online Charging System (OCS) 650; AMF 655; and SMF 635. A Structured Data Storage Function (SDSF) 660 is coupled to the NEF in some embodiments. A Packet Flow Description Function (PFDF) 630 is coupled to the NEF 525 and the SMF 635. A UPF 665 is coupled to the SMF 635. Coupling may be provided via various network interfaces.

Figure 6B:
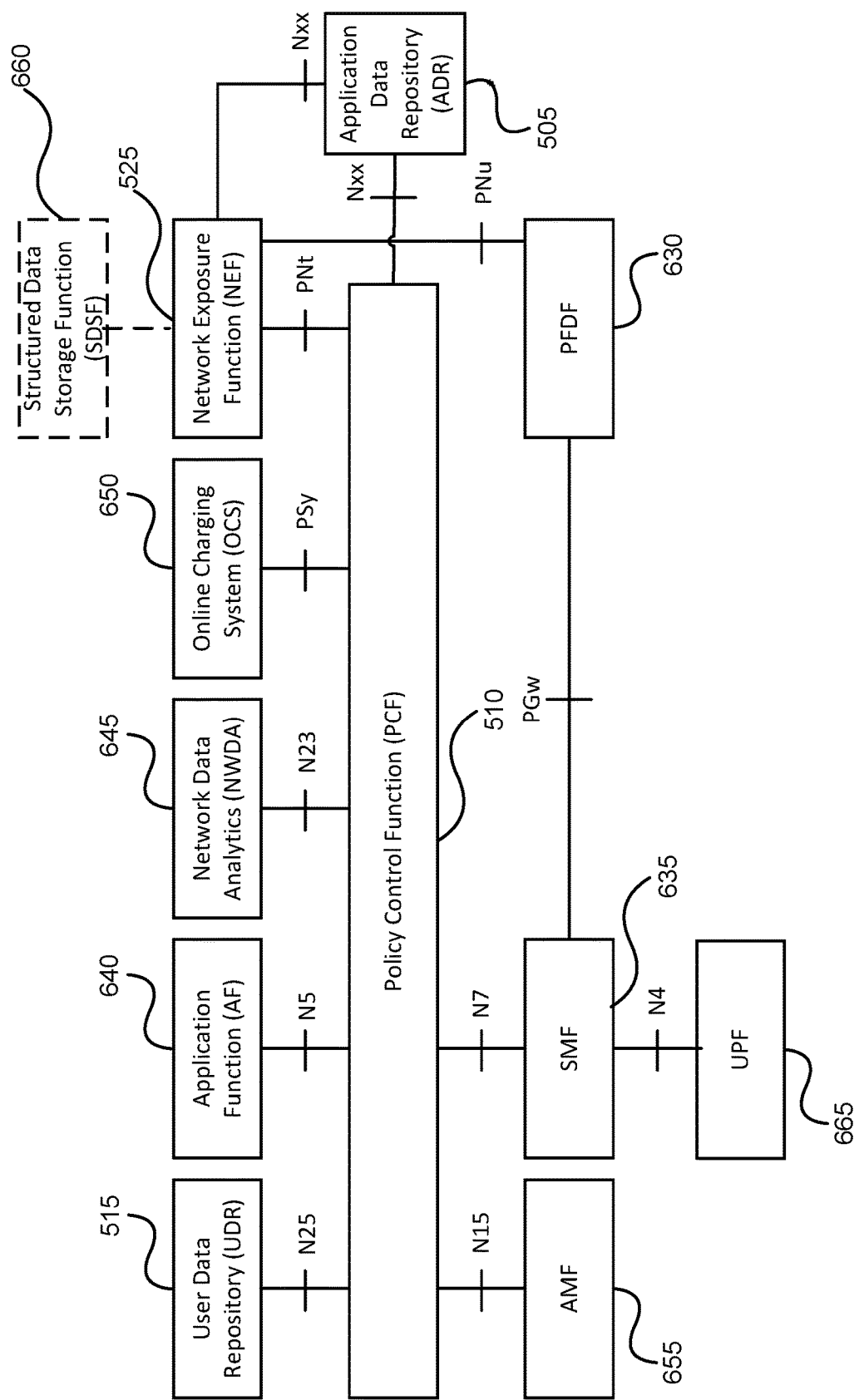
FIG. 6B illustrates, in further detail, interoperation between various functional elements of a 5G network including the ADR, in accordance with another embodiment of the present disclosure.

FIG. 6B illustrates interoperation between various functional elements of a 5G network including the ADR 505, in accordance with another embodiment of the present disclosure. FIG. 6B is similar to FIG. 6A except that the ADR 505 is shown as being directly coupled to the NEF 525.

Figure 7:
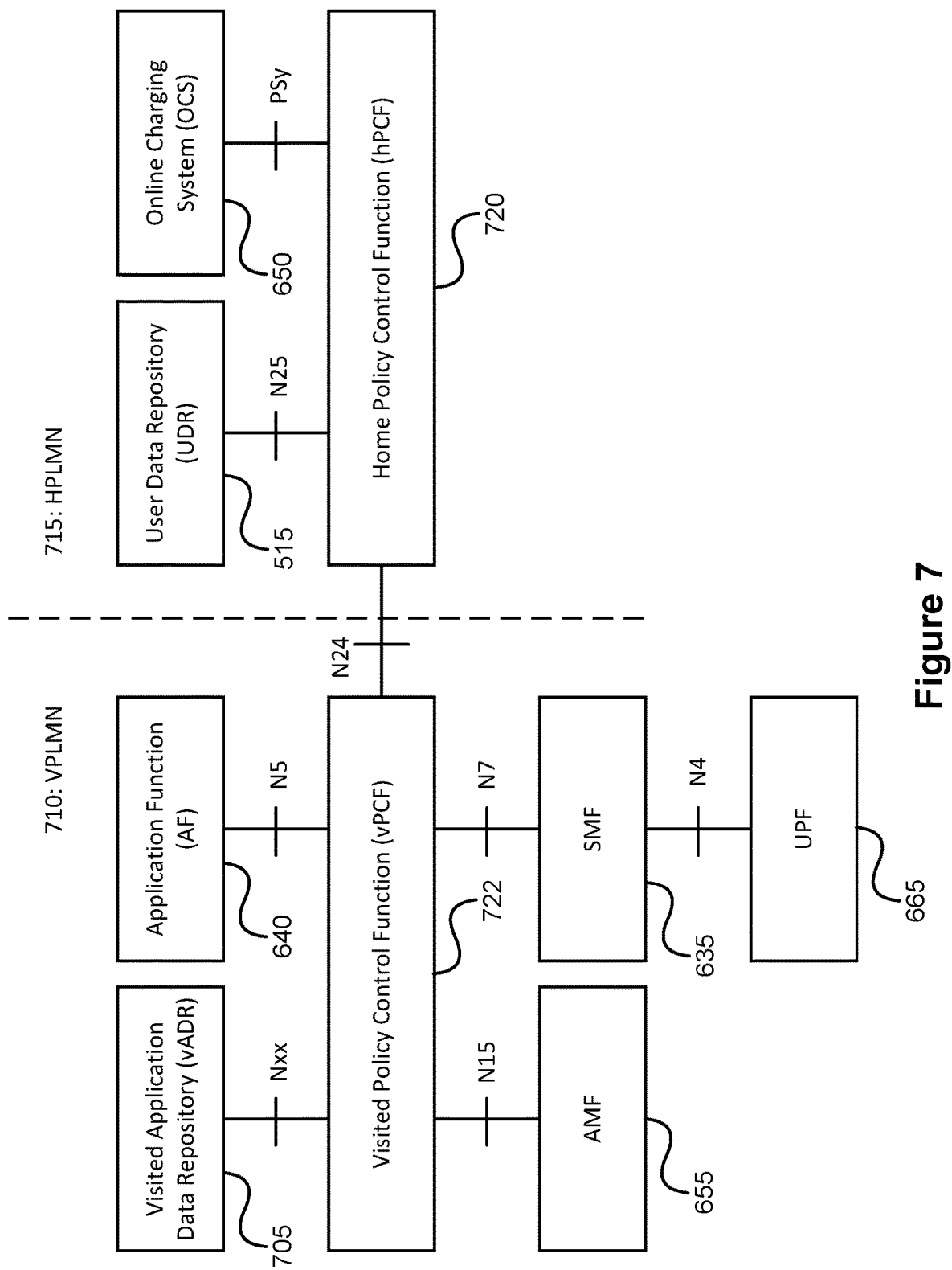
FIG. 7 illustrates, in further detail, interoperation between various functional elements of a 5G network, in accordance with another embodiment of the present disclosure.

FIG. 7 illustrates, in further detail, interoperation between various functional elements of a 5G network, in accordance with an embodiment of the present disclosure. FIG. 7 applies to a roaming scenario for a 5G network, e.g. in association with a 5G policy framework architecture. In particular, FIG. 7 applies to a local breakout scenario, in which the AF 640 resides in the VPLMN 710, and in which a Visited Application Data Repository (vADR) 705 in the VPLMN 710 performs the function of the ADR. A (e.g. roaming) UE can connect to the Data Network via the UPF 665 of the VPLMN 710, in which case traffic may flow through the UPF 665 and reach the Data Network (and the Application Function 640 inside the DN) without necessarily passing through the HPLMN 715.

In further detail, FIG. 7 illustrates a HPLMN 715 and a VPLMN 710. The HPLMN 715 includes a UDR 515 and a OCS 650 coupled to a hPCF 720. The VPLMN 710 includes a vADR 705, AF 640, AMF 655 and SMF 635 coupled to a vPCF 722. (The prefixes "h" and "v" on acronyms denote "home" and "visited", respectively, and indicate that different instances of a node or function can reside in the HPLMN and VPLMN.) The VPLMN 710 further includes a UPF 665 coupled to the SMF 635. The hPCF 720 and vPCF 722 are also coupled together. Coupling may be via appropriate network interfaces.

In some embodiments with respect to FIG. 7, the ADR may exist (e.g. be instantiated) in both the HPLMN 715 and the VPLMN 710. That is, in both VPLMN 710 and HPLMN 715, the local ADR may store policy requirements (e.g. AF request) that are related to the UE.

Figure 8:
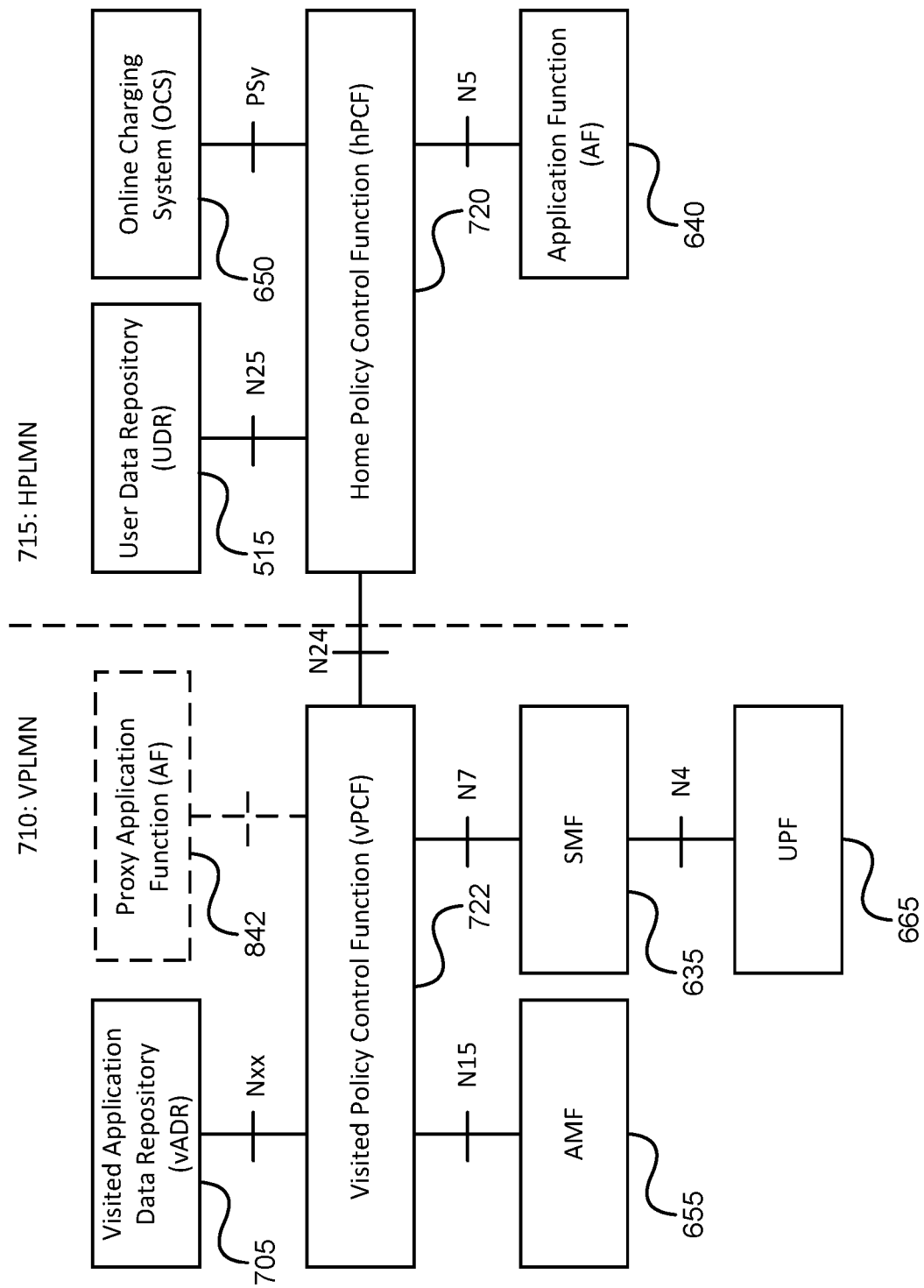
FIG. 8 illustrates, in further detail, interoperation between various functional elements of a 5G network, in accordance with another embodiment of the present disclosure.

FIG. 8 illustrates, in further detail, interoperation between various functional elements of a 5G network, in accordance with an embodiment of the present disclosure. As with FIG. 7, FIG. 8 also applies to a roaming scenario for a 5G network, e.g. in association with a 5G policy framework architecture. In particular, FIG. 8 applies to a local breakout scenario, in which the AF 640 resides in the HPLMN 715 rather than the VPLMN 710, and in which a Visited Application Data Repository (vADR) 705 in the VPLMN 710 performs the function of the ADR with respect to a given (roaming) UE. A UE can connect to the data network via the UPF 665 in the VPLMN 710. In some embodiments, another AF in the VPLMN may be provided and configured to act on behalf of the AF 640 of the HPLMN 715, as required, and with respect to the handling of user plane data.

In the above scenario, the AF 640 in HPLMN 715 contacts an AF in VPLMN 710 and requests that AF to interact with the VPLMN 710 on its behalf. The proxy AF in the VPLMN writes the AF request into the vADR 705, and the AF request is received from the AF 640 in HPLMN 715. A possible proxy AF, interacting with the VPLMN in response to the request from the HPLMN, is shown in FIG. 8 as AF 842 in the VPLMN 710.

In further detail, FIG. 8 illustrates a HPLMN 715 and a VPLMN 710. The HPLMN 715 includes a UDR 515, OCS 650 and AF 640 coupled to a hPCF 720. The VPLMN 710 includes a vADR 705, AMF 655 and SMF 635 coupled to a vPCF 722. The VPLMN 710 further includes a UPF 665 coupled to the SMF 635. The hPCF 720 and vPCF 722 are also coupled together. Coupling may be via appropriate network interfaces.

Figure 9:
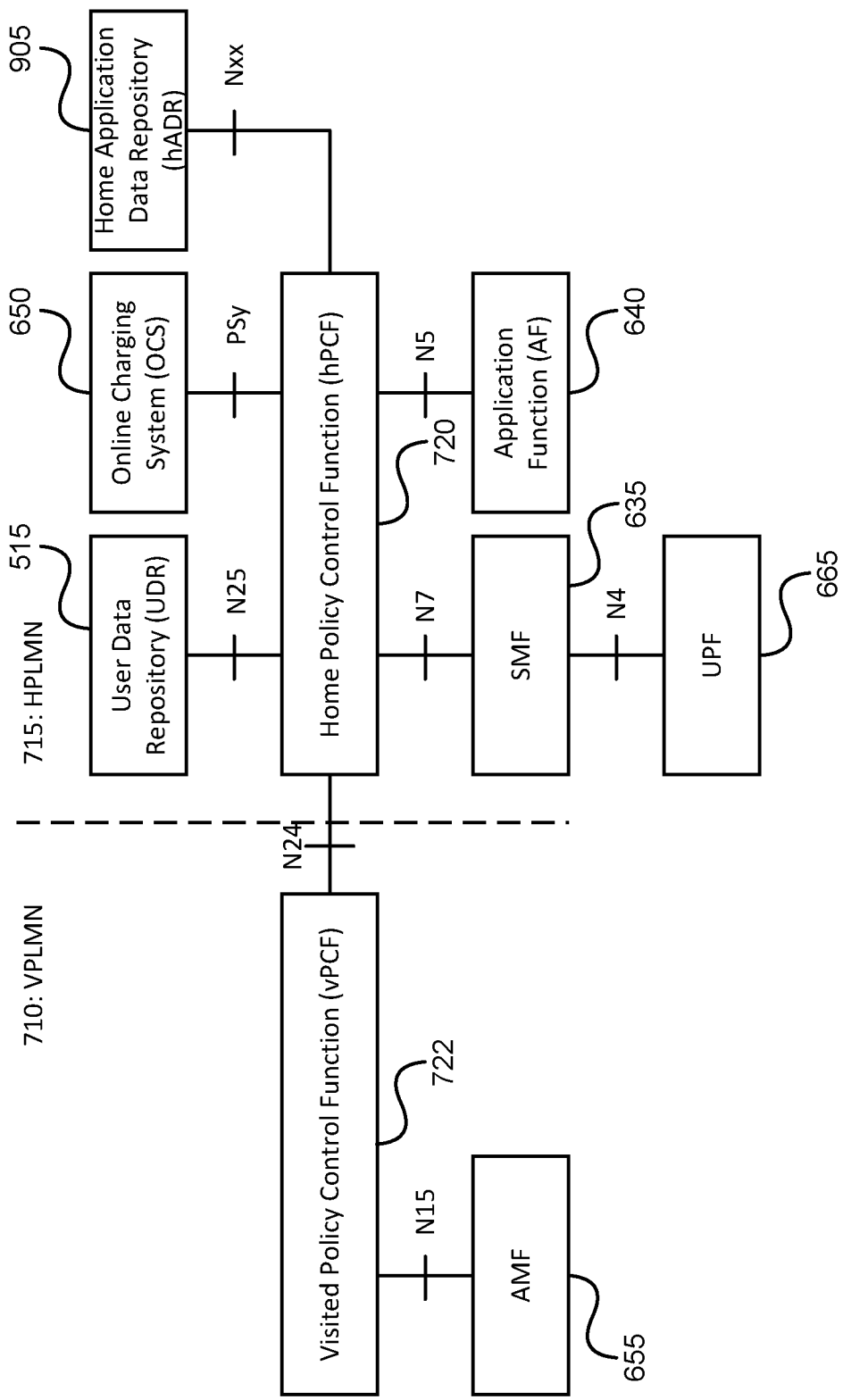
FIG. 9 illustrates, in further detail, interoperation between various functional elements of a 5G network, in accordance with another embodiment of the present disclosure.

FIG. 9 illustrates, in further detail, interoperation between various functional elements of a 5G network, in accordance with an embodiment of the present disclosure. FIG. 9 also applies to a roaming scenario for a 5G network, e.g. in association with a 5G policy framework architecture. In particular, FIG. 9 applies to a home routed scenario, in which the AF 640 resides in the HPLMN 715, and in which a Home Application Data Repository (hADR) 905 in the HPLMN 715 performs the function of the ADR. A UE can connect to the Data Network via the UPF 665 in the HPLMN 715.

In further detail, FIG. 9 illustrates a HPLMN 715 and a VPLMN 710. The HPLMN 715 includes a UDR 515, OCS 650, hADR 905, SMF 635 and AF 640 coupled to a hPCF 720. The HPLMN 715 further includes a UPF 665 coupled to the SMF 635. The VPLMN 710 includes a AMF 655 coupled to a vPCF 722. The hPCF 720 and vPCF 722 are also coupled together. Coupling may be via appropriate network interfaces.

Figure 10:
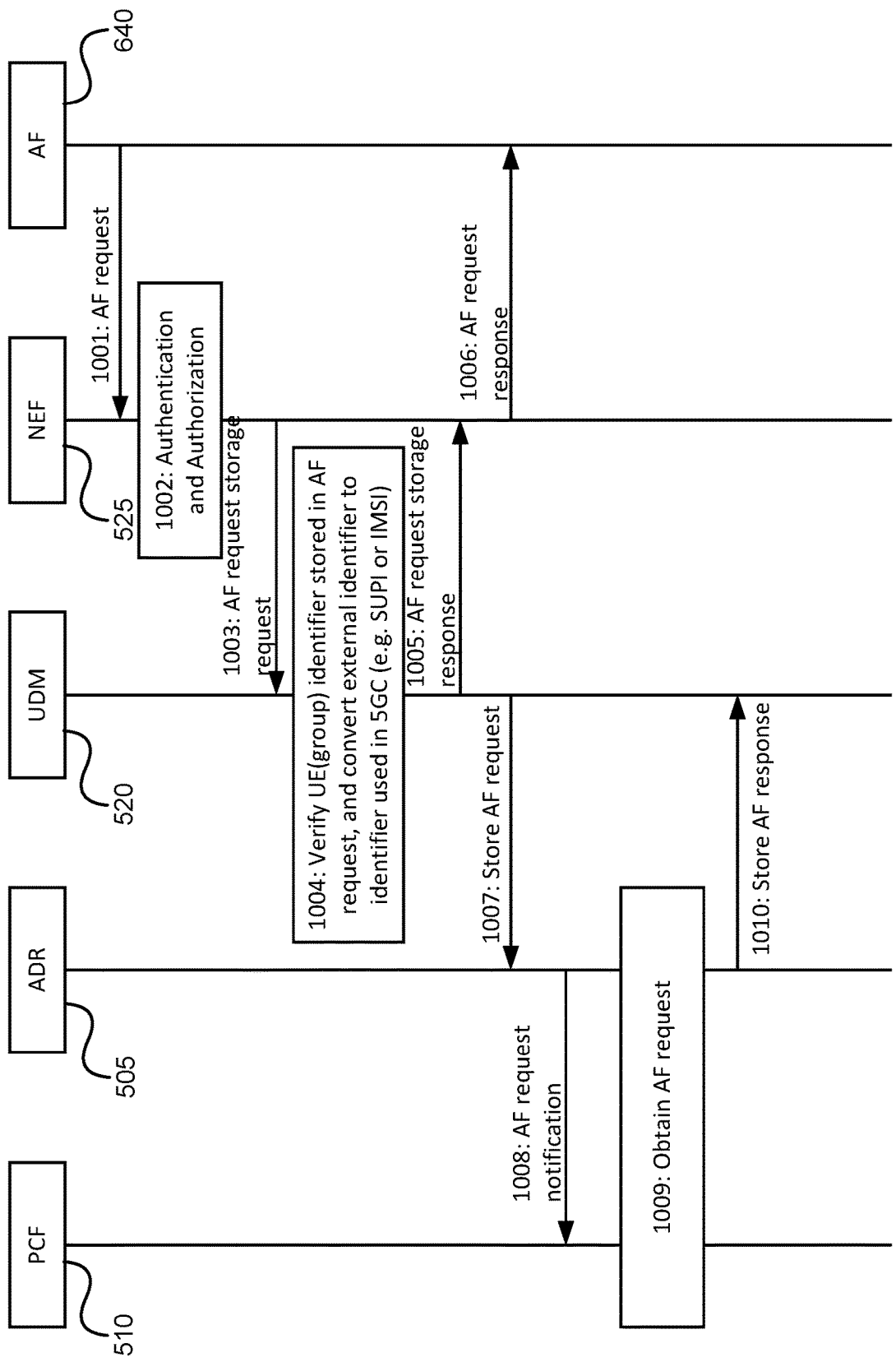
FIG. 10 illustrates a call flow provided in accordance with an embodiment of the present disclosure.

FIG. 10 illustrates a call flow provided in accordance with an embodiment of the present disclosure. The call flow can be implemented for example in the non-roaming scenario as illustrated in, and described with respect to, FIG. 6.

In more detail, the AF transmits 1001 an AF request to the NEF. The NEF then performs 1002 authentication and authorization. The NEF then transmits 1003 an AF request storage request to the UDM. The UDM then verifies 1004 one or both of a UE identifier and a group identifier carried in the AF request, and converts an external identifier (if applicable) to an identifier used in the 5G Core (e.g. a SUPI or IMSI). For example, the UDM may replace the UE's external identifier carried in the AF request with the corresponding IMSI. The UDM then transmits 1005 an AF storage response to the NEF. The NEF then transmits 1006 an AF request response to the AF. The UDM also transmits 1007 the AF request to the ADR for storage (or transmits a request to initiate storage of the AF request). The ADR, upon storage, transmits 1008 a notification to the PCF indicative that the AF request has been stored. The PCF and ADR then interact so that the AF request is obtained 1009 by the PCF (by transmission thereto). The ADR also transmits 1010 a response to the UDM indicative that the AF request storage has been performed, and in some embodiments indicative that the PCF has obtained the AF request.

In some embodiments, with respect to FIG. 10 and also in other scenarios, the NEF may be omitted, for example the functions of the AF and the NEF can be merged. For example the NEF may be incorporated into the AF so that the AF may communicate directly with the UDM. This may be the case if the AF is in a trusted domain, for example. Where the functionality of the NEF is merged with that of the AF, the NEF may be omitted and the illustrated operations thereof performed by the AF. As such, in FIG. 10, authorization and authentication 1002 may be omitted, actions 1001 and 1003 may be merged, and actions 1004 and 1005 may be merged. This can also be applied to embodiments illustrated in other figures.

If the AF interacts with UDM directly, the AF request can also be treated as an "AF request storage request" by the UDM (a data management function). The AF request storage request is a request to store the AF request. If interaction between the AF and the UDM is via the NEF, the NEF receives the AF request and generates the AF request storage request to be sent to the ADR or the UDM, and the AF request storage request indicates the "AF request". As such, the UDM or ADR receives the AF request storage request, while the AF may send either the AF request or the AF request storage request, depend on whether NEF is involved.

FIG. 10 illustrates the use of UDM for accessing the ADR when the AF is in the HPLMN. In this procedure, between actions 1003 and 1005, the UDM verifies UE (group) identifier in the AF request and performs UE (group) identity verification or conversion (from External Identifier to SUPI such as IMSI).

Figure 11:
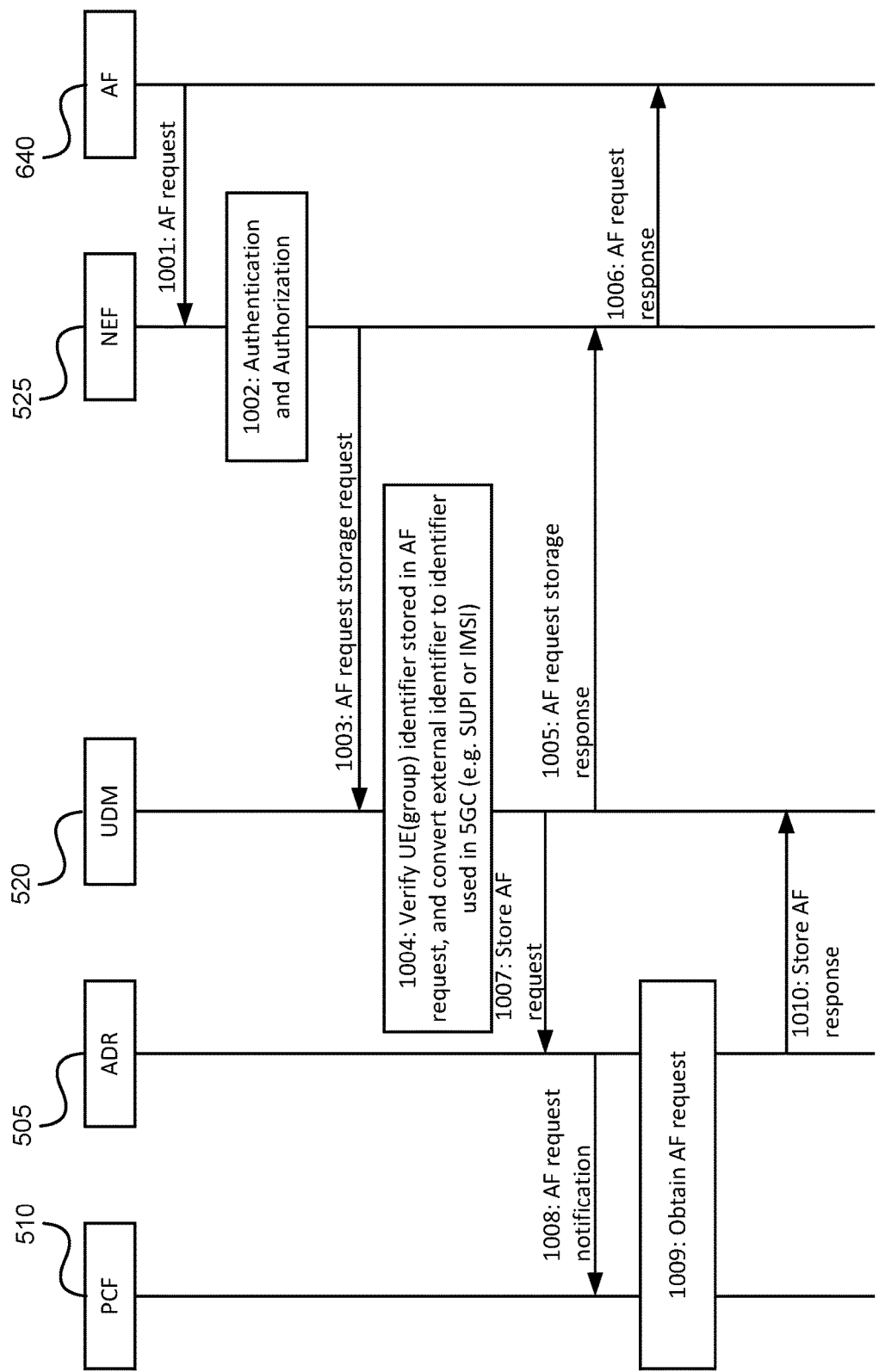
FIG. 11 illustrates a call flow provided in accordance with another embodiment of the present disclosure.

FIG. 11 illustrates a call flow provided in accordance with another embodiment of the present disclosure. FIG. 11 is similar to FIG. 10 except that the AF request storage response 1005 and AF request response 1006 are transmitted after the AF request storage into the ADR is initiated, completed, or both initiated and completed 1007 with the ADR.

Figure 12:
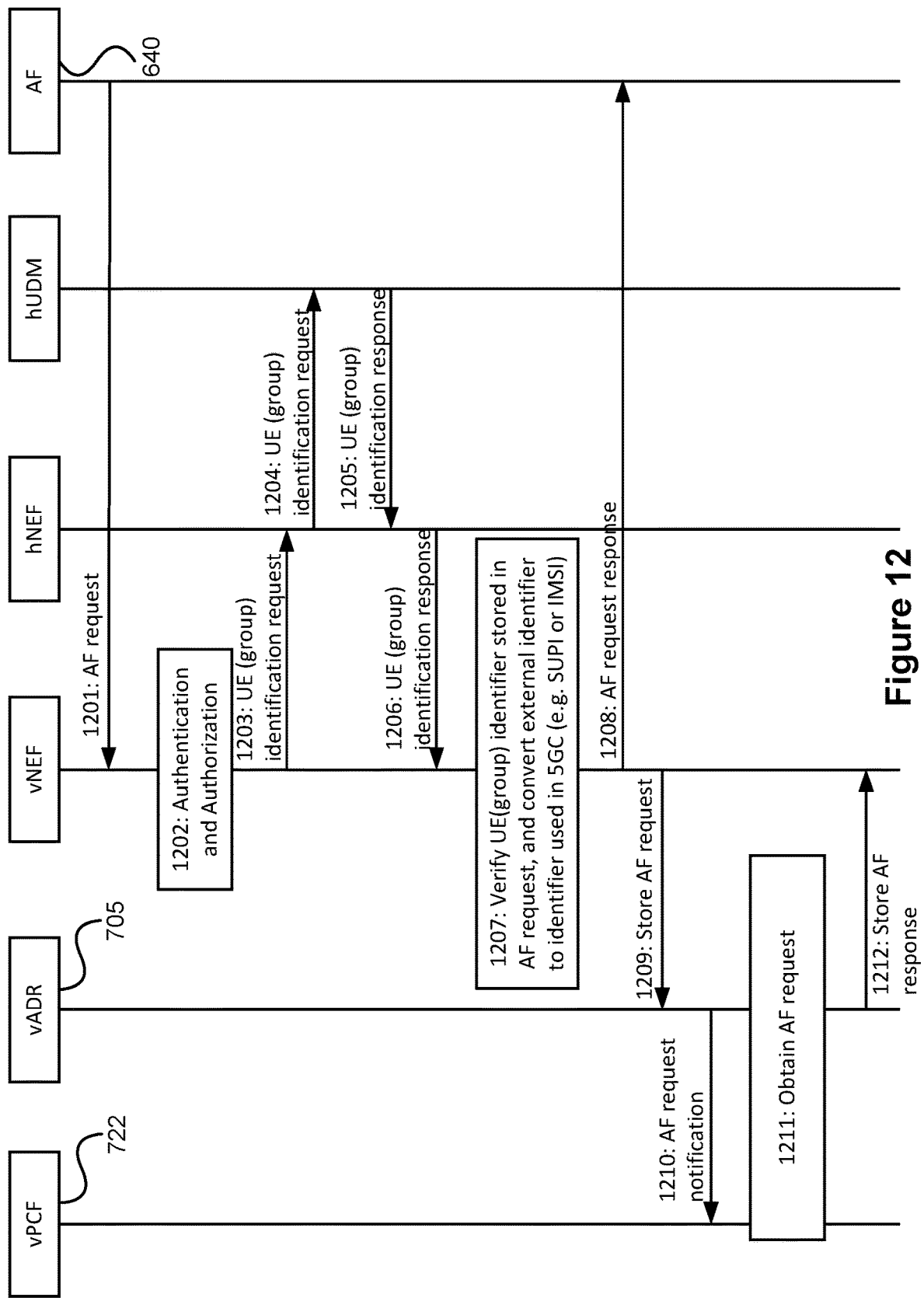
FIG. 12 illustrates a call flow provided in accordance with another embodiment of the present disclosure.

FIG. 12 illustrates a call flow provided in accordance with another embodiment of the present disclosure. The call flow can be implemented for example in the roaming scenario as illustrated in, and described with respect to, FIG. 7. If the AF is a proxy AF, the call flow can be implemented in the roaming scenario as illustrated in, and described with respect to, FIG. 8.

In more detail with respect to FIG. 12, the AF transmits an AF request 1201 to the vNEF. The vNEF then performs 1202 authentication and authorization. Verification operations are then performed in actions 1203, 1204, 1205 and 1206 as follows. The vNEF transmits 1203 one or both of a UE identification request and a group identification request to the hNEF. The request may include one or both of UE external identifiers and group external identifiers, which are identifiers (e.g. External Identifier, External Group Identifier) exposed to the external party. The hNEF then transmits 1204 (or forwards) a UE identification request, a group identification request, or both, to the hUDM. In response to the request, the hUDM transmits 1205 a UE/group identification response to the hNEF, and the hNEF transmits 1206 (or forwards) a UE/group identification response to the vNEF. Receipt of the response from the hUDM may trigger hNEF to perform the transmission 1206. The vNEF receives the response from the hNEF. The vNEF then verifies 1207 the UE/group identifier stored in the AF request, and converts external identifiers in the AF request to identifiers (from action 1206) used in the 5GC (e.g. SUPI or IMSI). The vNEF then transmits 1208 an AF request response to the AF, thus responding to the AF request. The AF request response may in some cases indicate a failure or error code (e.g. if action 1206 indicated failure), in which case subsequent illustrated actions may be omitted. Further, the vNEF stores 1209, or initiates/requests storage of, the AF request in the vADR. Following storage or at least following initiation thereof, the vADR transmits 1210 an AF request notification to the vPCF that has subscribed to receive the AF request. The vPCF and the vADR interact so that the vPCF obtains 1211 the AF request. The vADR may also transmit 1212 a response to the vNEF indicative that the AF request has been stored.

In some embodiments, for the requests in one or both of actions 1203 and 1204, the UE or group identification requests may comprise a first UE or group identifier in a format other than a format used in a core network supporting the HPLMN. In this case, one or both of the response in actions 1205 and 1206 can comprise a second UE or group identifier corresponding to the first UE or group identifier, where the second UE or group identifier is in a format used in the core network.

The response in action 1205 may include the UE identifiers or group identifiers used within 5GC (such as SUPI or IMSI, subscription group ID or IMSI-Group identifier). In some embodiments, the response may include an error code indicating invalid external identifiers.

FIG. 12 illustrates the use of vNEF for accessing the vADR when the AF is in the VPLMN. In this procedure, the vNEF verifies UE (group) identifier in the AF request and performs UE (group) identity verification or conversion (from External Identifier to SUPI such as IMSI) through actions 1203 to 1206. The actions 1203 to 1206 are verification steps, that in various embodiments correspond to the verification step also shown in action 1207. Therefore, in some embodiments, if actions 1203 to 1206 are included, action 1207 may be omitted, and vice-versa. This is also applicable to other illustrated embodiments.

Figure 13:
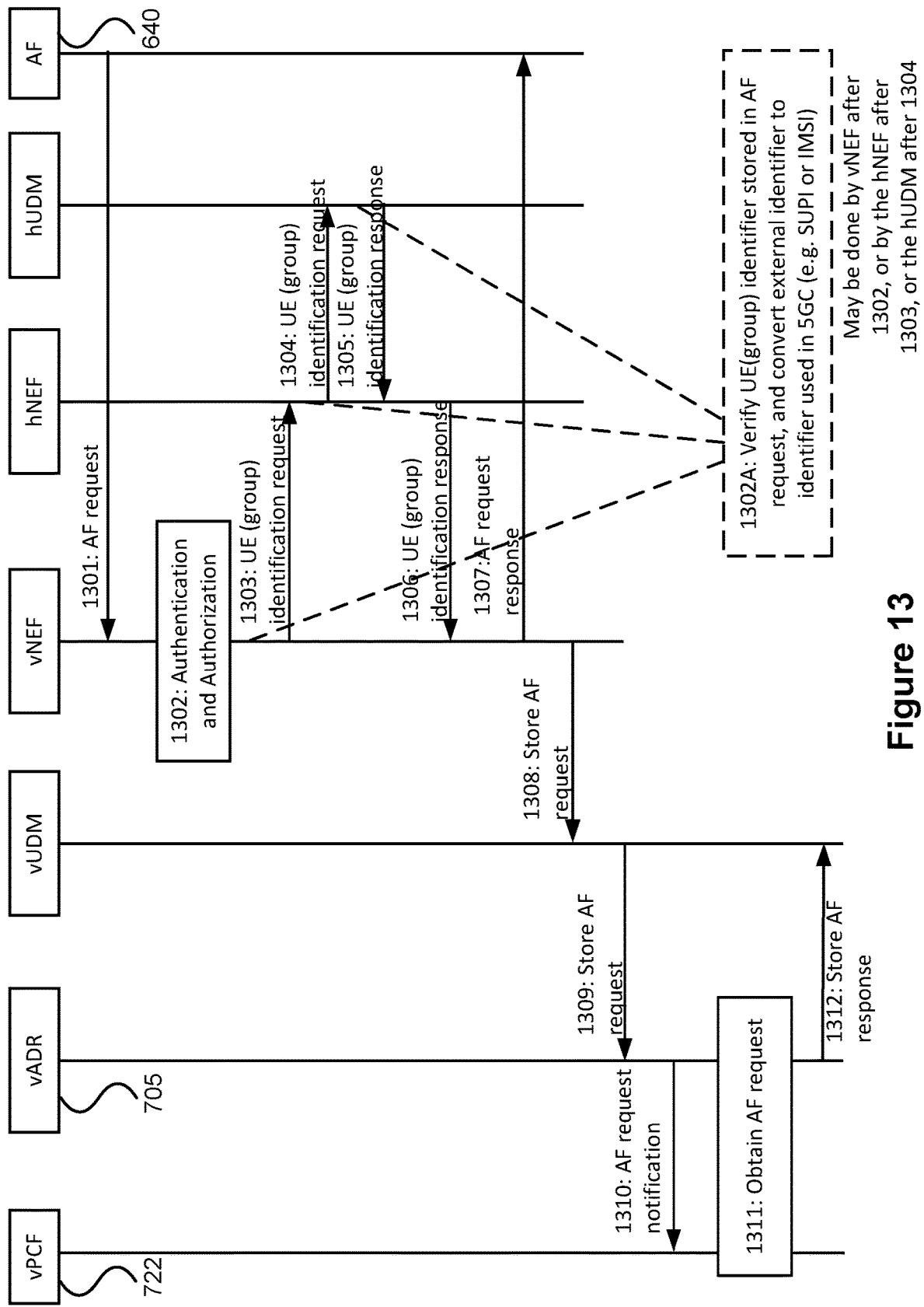
FIG. 13 illustrates a call flow provided in accordance with another embodiment of the present disclosure.

FIG. 13 illustrates a call flow provided in accordance with another embodiment of the present disclosure. For clarity, messages having similar names (e.g. between FIGS. 12 and 13) can be understood to include similar content. In more detail with respect to FIG. 13, the AF transmits 1301 an AF request to the vNEF. The vNEF then performs 1302 authentication and authorization. The vNEF then transmits 1303 one or both of a UE identification request and a group identification request to the hNEF. The hNEF then transmits 1304 (or forwards) a UE or group identification request (or both) to the hUDM. In response to the request, the hUDM transmits 1305 a UE or group identification response (or both) to the hNEF, and the hNEF transmits 1306 (or forwards) a UE or group identification response (or both) to the vNEF. In addition, one of the vNEF, hNEF and hUDM may verify 1302A the UE identity stored in the AF request, and convert external identifiers in the AF request to identifiers used in 5GC, if applicable. The vNEF then transmits 1307 an AF request response to the AF, thus responding to the AF request. Further, the vNEF requests/initiates 1308, with respect to the vUDM, storage of the AF request. The vUDM in turn requests/initiates 1309 storage of AF request in the vADR. Upon storage (or initiation of storage), the vADR transmits 1310 an AF request notification to the vPCF. The vPCF and the vADR interact so that the vPCF obtains 1311 the AF request. The vADR may also transmit 1312 a response to the vUDM indicative that the AF request has been stored. The vUDM may transmit a similar response to the vNEF.

Actions 1201 to 1206 in FIG. 12 may be substantially identical to actions 1301 to 1306 in FIG. 13. A difference between FIGS. 12 and 13 can be seen in how the vNEF write the AF request into the vADR. In FIG. 13, the vUDM is involved in this writing of the AF request.

In some embodiments with respect to FIG. 13, in action 1303, the vNEF provides the UE's External Identifier to the hNEF. In some embodiments, in actions 1304 and 1305, the hNEF obtains the UE's IMSI from hUDM using the External Identifier. In some embodiments, in action 1306, hNEF provides the IMSI to vNEF as a response to action 1303. In some embodiments, in action 1308, the UE's External Identifier in AF request is replaced with the IMSI (or SUPI).

In various embodiments, the UE's External Identifier is the External Identifier defined in clause 19.7.2 of 3GPP TS 23.003.

The above description of actions 1303 to 1306 and 1308 may also apply to External Group Identifiers, which are to be replaced with subscription group IDs or IMSI-Group identifier (an identifier used internally within 5GC).

Figure 14:
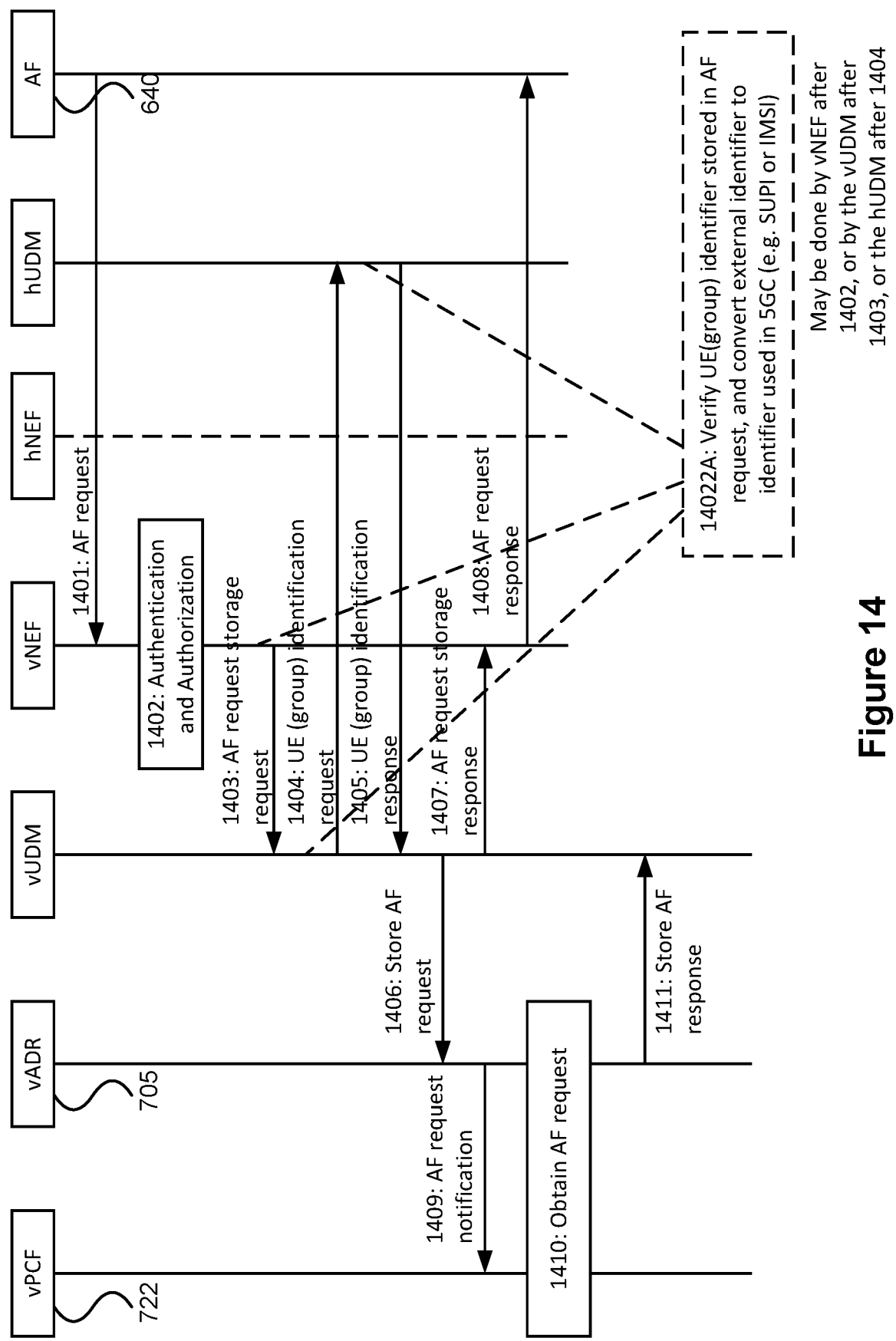
FIG. 14 illustrates a call flow provided in accordance with another embodiment of the present disclosure.

FIG. 14 illustrates a call flow provided in accordance with another embodiment of the present disclosure. An interface is defined between vUDM and hUDM and used for identification requests of individual UEs, UE groups, or a combination thereof. For example, the UE or group identification requests can comprise obtaining an IMSI or an IMSI-Group ID according to an external identifier. In this embodiment, the hNEF is not involved in the call flow.

In more detail with respect to FIG. 14, the AF transmits 1401 an AF request to the vNEF. The vNEF then performs 1402 authentication and authorization. The vNEF then requests/initiates 1403, with respect to the vUDM, storage of the AF request. The vUDM then transmits 1404 one or both of a UE identification request and a group identification request to the hUDM. In response to the request, the hUDM transmits 1405 one or both of a UE identification response and a group identification response to the vUDM. In addition, one of the vNEF, vUDM and hUDM may verify 1402A the UE identity stored in the AF request, and convert external identifiers to identifiers used in 5GC, if applicable. The vUDM then requests/initiates 1406 storage of the AF request in the vADR. The vADR transmits 1409 an AF request notification to the vPCF upon such storage (or at least upon initiating storage). The vPCF and the vADR interact so that the vPCF obtains 1410 the AF request. (E.g. the vPCF makes a request and receives the AF request in response.) The vADR may also transmit 1411 a response to the vUDM indicative that the AF request has been stored. Further, after the vUDM requests or initiates 1406 the AF request storage in the vADR, the vUDM transmits 1407 an AF request storage response to the vNEF, and the vNEF transmits 1408 (or forwards) an AF request response to the AF.

Figure 15:
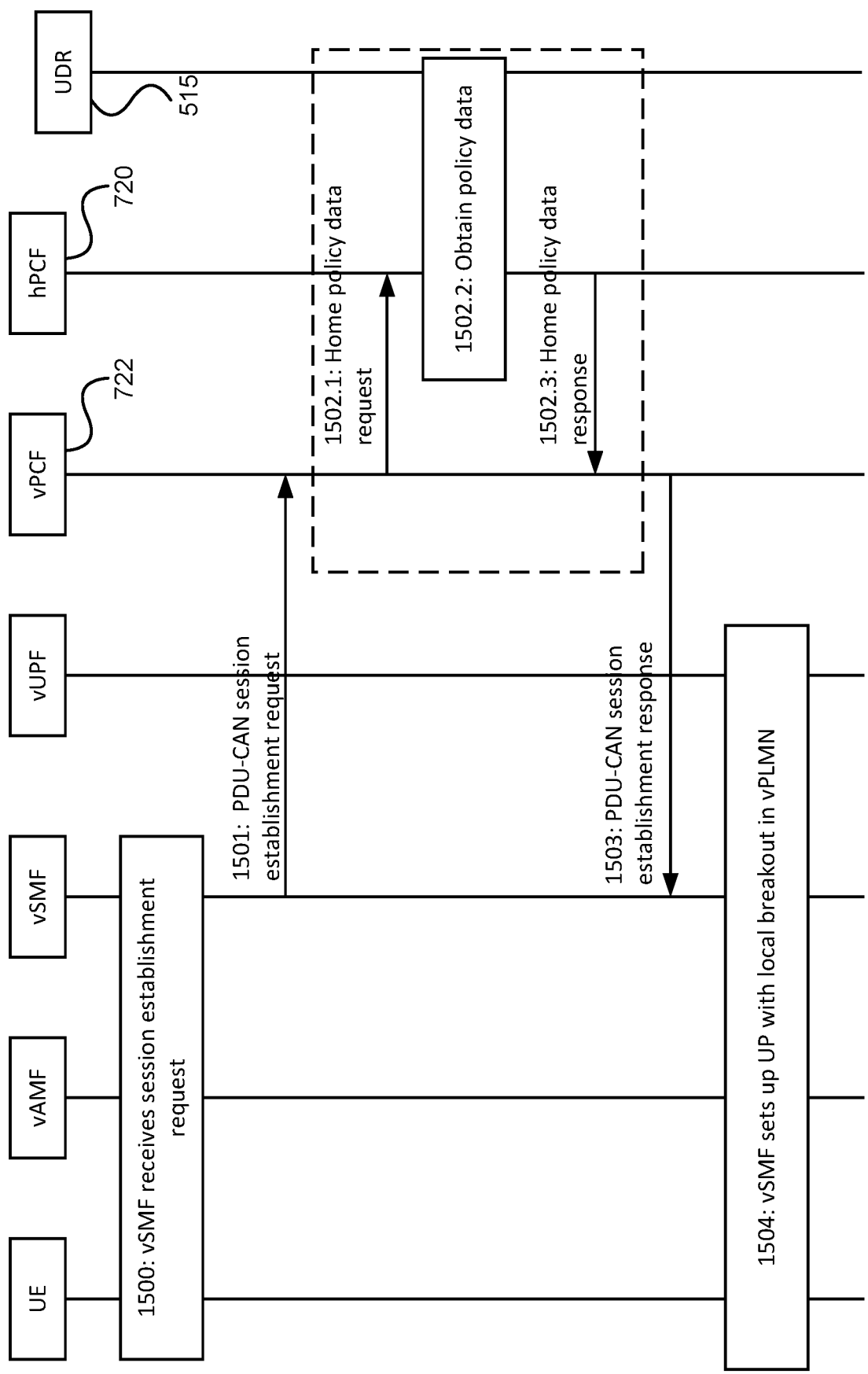
FIG. 15 illustrates a call flow provided in accordance with another embodiment of the present disclosure.

FIG. 15 illustrates a call flow applicable in relation to group membership checks in local breakout roaming, according to an embodiment of the present disclosure. This operation is applicable to both the SDSF-based approach and the ADR-based approach (i.e. when either SDSF or ADR are used for AF request storage).

In more detail, following receipt 1500 by the vSMF of a session establishment request, the vSMF transmits 1501 a PDU-CAN (PDU Connectivity Access Network) session establishment request to the vPCF. The vPCF, hPCF and UDR then interact as follows. The vPCF transmits 1502.1 a home policy data request to the hPCF; the hPCF and the UDR interact 1502.2 to obtain policy data (e.g. for a UE group membership check); and the hPCF then transmits 1502.3 a home policy data response to the vPCF. The vPCF then transmits 1503 a PDU-CAN session establishment response to the vSMF. Subsequently, the vSMF sets up 1504 the User Plane (UP) with local breakout in the vPLMN according to the policy rules received in action 1503.

The session establishment request may include one or both of: UE identifier(s) (such as SUPI or IMSI); and group identifier(s). The group identifier(s) may be external identifiers (such as External Group Identifier). The home policy data request may indicate a request for one or both of UE identification and group identification.

The home policy data response may include the group membership verification result, if the request in action 1501 includes both UE's SUPI and group identifier(s). If the request in action 1501 includes only UE's SUPI (no group (identifiers), the message may include the identifiers of subscription groups that the UE belongs to. The relevant information may be obtained from the UDR via actions 1502.1 to 1502.3.

The session establishment response may include or indicate policy rules to be applied to the PDU session. The policy rules may be determined according to the UE's group membership.

In some embodiments with respect to FIG. 15, in action 1502.1, the vPCF provides UE's IMSI and the Group Identifier to hPCF. In some embodiments, in action 1502.2, the hPCF obtains subscription group information of the UE from UDR using the IMSI. In some embodiments, in action 1502.3, the hPCF replies with the vPCF with the verification result.

Figure 16:
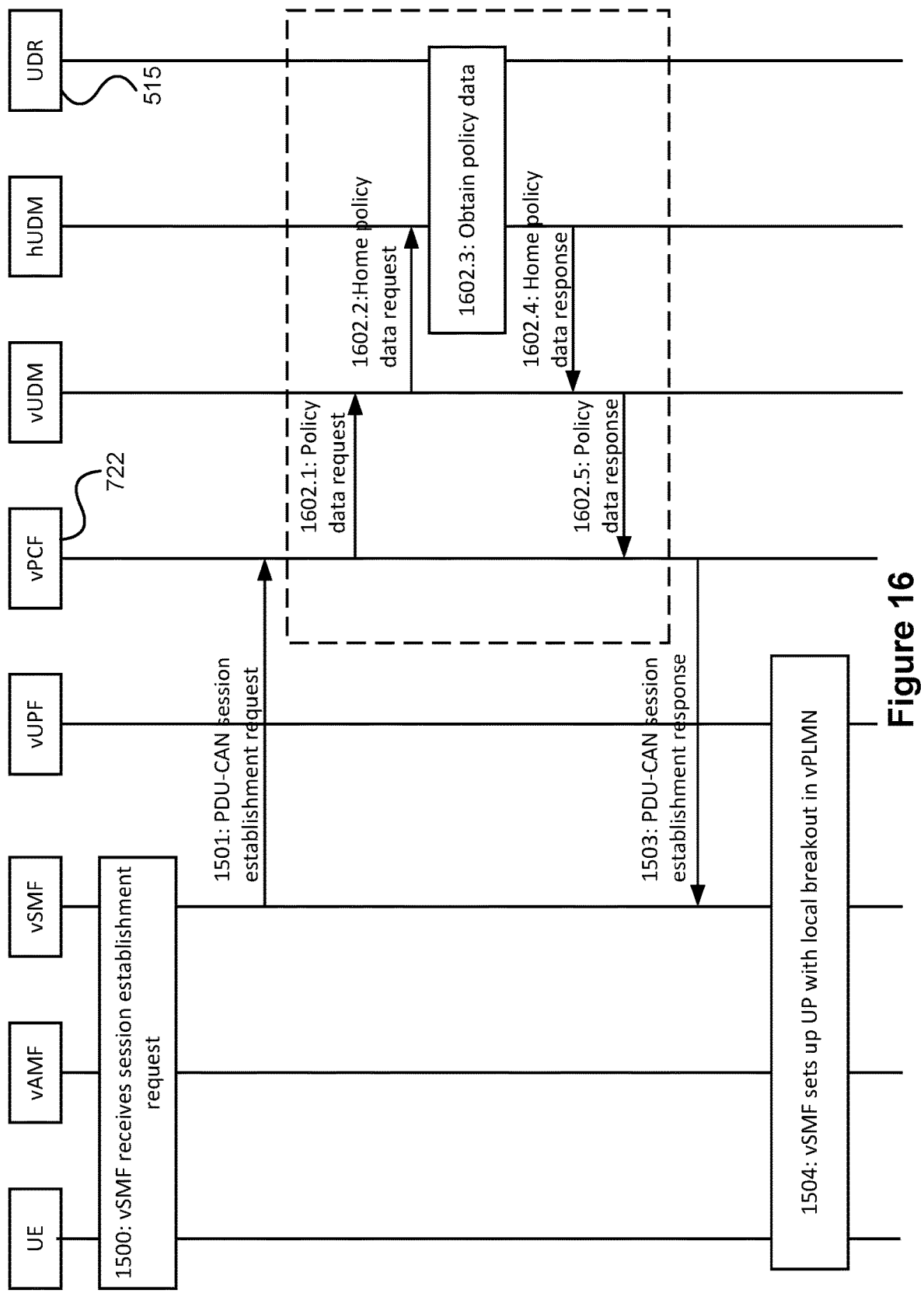
FIG. 16 illustrates a call flow provided in accordance with another embodiment of the present disclosure.

FIG. 16 illustrates a call flow applicable in relation to group membership checks, according to another embodiment of the present disclosure. In this embodiment, an interface between vUDM and hUDM is defined and used for the group membership checks.

FIG. 16 is similar to FIG. 15, except that the hPCF is absent from the call flow and the vUDM and hUDM are involved in the call flow. The vPCF transmits 1602.1 a policy data request to the vUDM; the vUDM transmits a home policy data request to the hUDM; the hUDM and the UDR interact 1602.3 to obtain policy data; the hUDM transmits 1602.4 a home policy data response to the vUDM; and the vUDM then transmits 1602.5 a policy data response to the vPCF.

Figure 17:
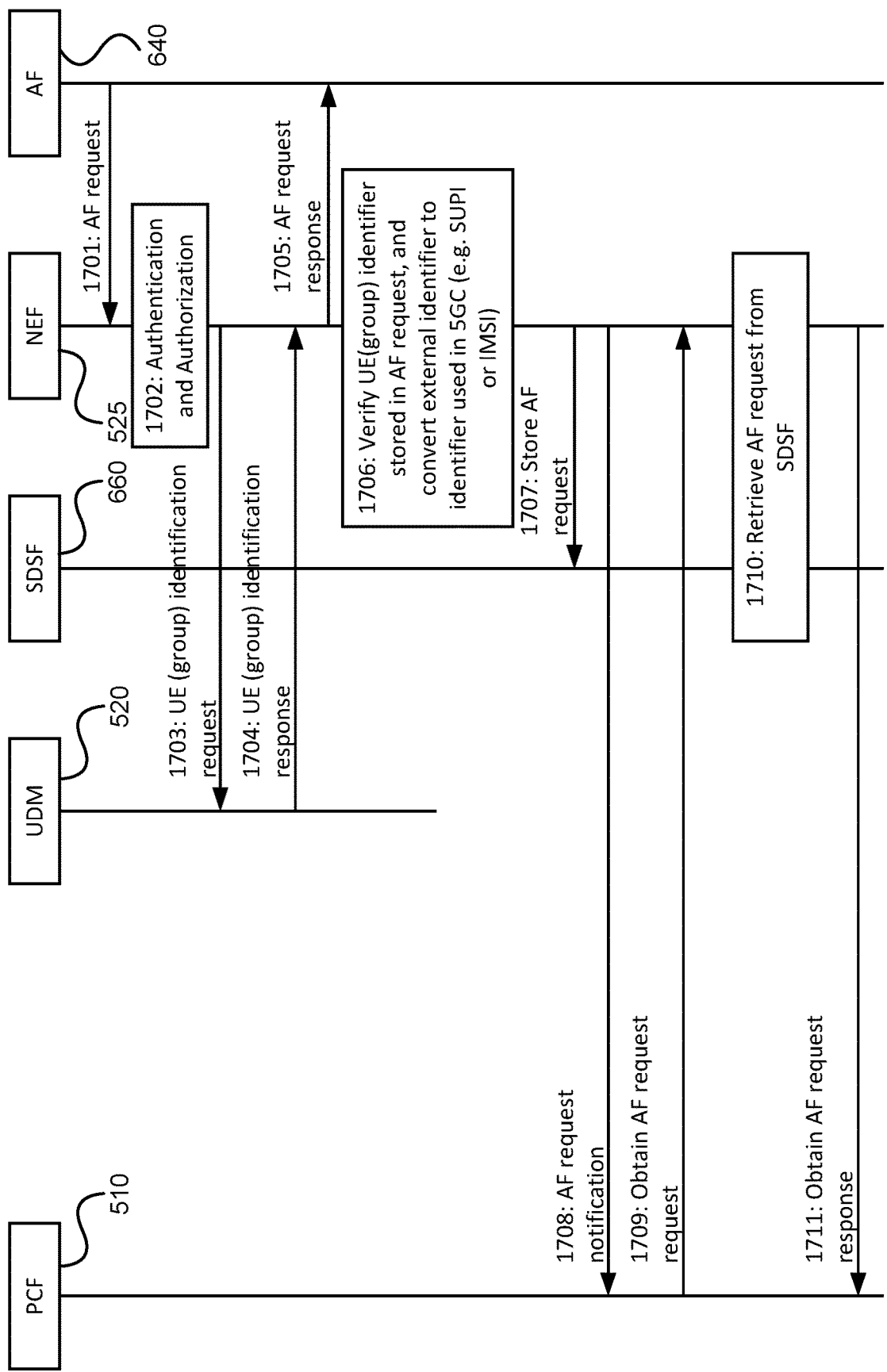
FIG. 17 illustrates a call flow provided in accordance with another embodiment of the present disclosure.

FIG. 17 illustrates an alternative approach in which AF requests are written into the SDSF rather than or in addition to the ADR, particularly for the case that the AF is in the HPLMN.

In more detail with respect to FIG. 17, the AF transmits 1701 an AF request to the NEF. The NEF then performs 1702 authentication and authorization. The NEF then transmits 1703 one or both of a UE identification request and a group identification request to the UDM. The UDM then transmits 1704 one or both of a UE identification response and a group identification response to the NEF, which include the internal identifiers (e.g. IMSI, IMSI-Group identifiers). The NEF then transmits 1705 an AF request response to the AF. The NEF convers the external identifiers in the AF request to the internal identifiers received from the UDM. The UDM then verifies 1706 the UE/group external identifier(s) in the request, and identifies the corresponding identifiers used in 5GC. The NEF further initiates storage 1707 of the AF request in the SDSF. The NEF also transmits 1708 a notification to the PCF (that has subscribed to receive the AF request) indicative that a new AF request has been stored. The PCF transmits 1709 a request to the NEF to obtain the stored AF request. The NEF retrieves 1710 the stored AF request from the SDSF. The NEF then responds 1711 to the PCF by providing the AF request.

Figure 18:
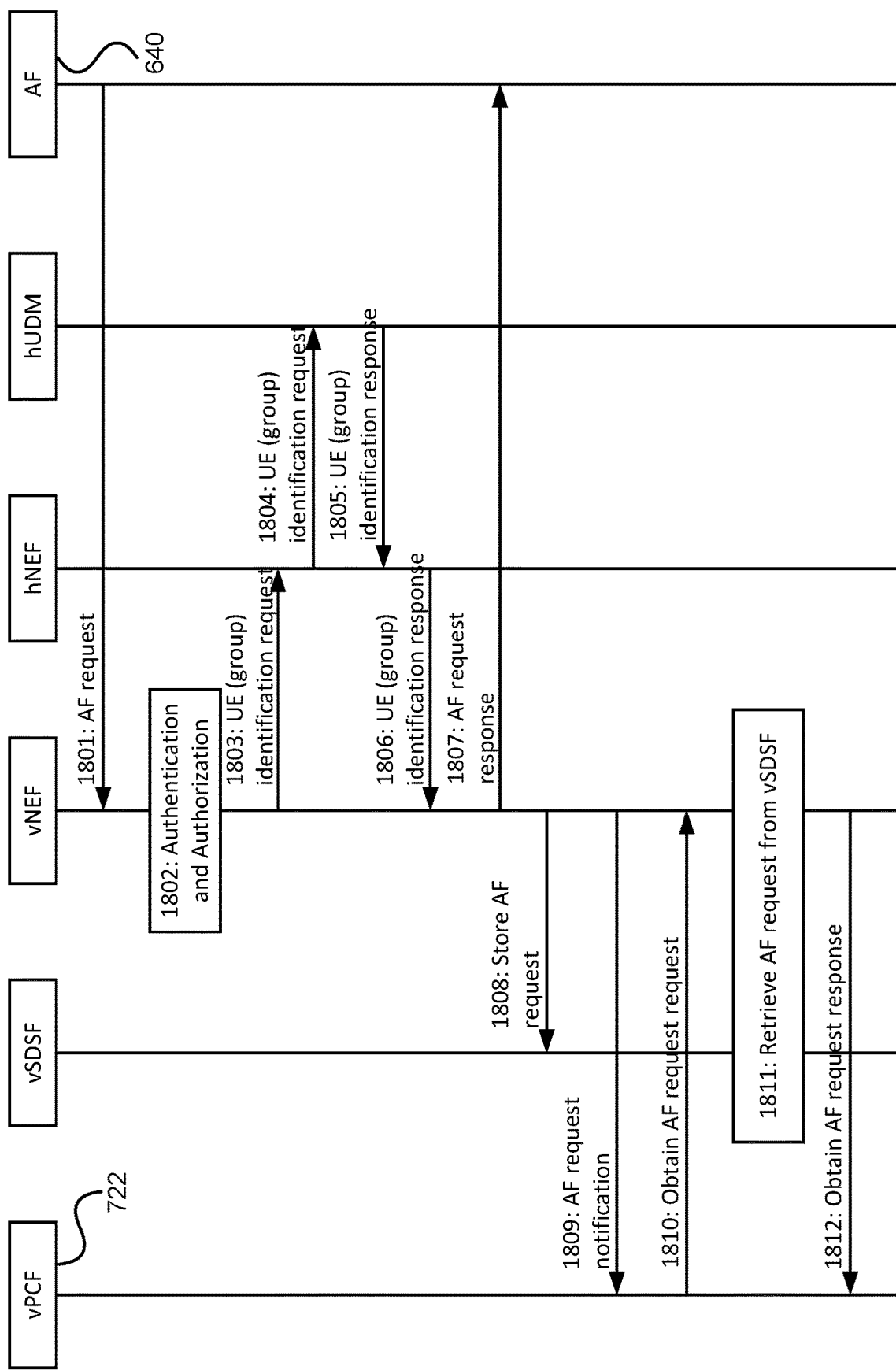
FIG. 18 illustrates a call flow provided in accordance with another embodiment of the present disclosure.

FIG. 18 illustrates an alternative approach in which AF requests are written into the SDSF, particularly for the case that the AF is in the VPLMN.

In more detail with respect to FIG. 18, the AF transmits 1801 an AF request to the vNEF. The vNEF then performs 1802 authentication and authorization. The vNEF then transmits 1803 one or both of a UE identification request and a group identification request to the hNEF. The hNEF transmits 1804 (or forwards) one or both of a UE identification request and a group identification request to the hUDM, and the hUDM responds 1805 to the hNEF with one or both of a UE identification response and a group identification response. The hNEF then transmits 1806 or forwards one or both of a UE identification response and a group identification response to the vNEF. The vNEF then transmits 1807 an AF request response to the AF. The vNEF further initiates storage 1808 of the AF request in the vSDSF. The vNEF also transmits 1809 a notification to the vPCF (that has subscribed to receive the AF request) indicative that a new AF request has been stored. The vPCF transmits 1810 a request to the vNEF to obtain the stored AF request. The vNEF retrieves 1811 the stored AF request from the vSDSF. The vNEF then responds 1812 to the PCF by providing the AF request.

Embodiments of the present disclosure can comprise to a 5G network or portions thereof, which is compliant with version 1.0.0 or later of TS 23.501 and version 0.3.0 or later of TS 23.502, but with the following stipulations which may or may not be specified in later versions of these documents. TS 23.502 version 0.3.0 refers to the 3GPP document of that reference number, entitled "Procedures for the 5G System," dated Apr. 20, 2017. The ADR is instantiated and implemented as described herein. The policy framework as described in TS 23.501 is adjusted to incorporate the ADR and its implantation as described herein, particularly with respect to the reference architecture in clause A.2.1 and the reference points in clause A.2.2. AF request sharing among PCFs as described in clause 6.3.7.2, TS 23.501 is modified to accommodate the ADR and its implementation. AF request sharing among PCFs is implemented in accordance with TS 23.502 in a manner which accommodates the ADR and its implementation.

It should be understood by those of skill in the art that as the ADR and UDR can both be used for data storage, the ADR may be implemented as a thin function, that receives requests for storage and retrieval of data, and can re-map the requests and forward them to the UDR which can then store and retrieve the data. In other embodiments, the UDR may be implemented as the thin function that relies upon the ADR for storage and retrieval functions. With reference to FIG. 5A, such an embodiment would entail the addition of a connection between the ADR and UDR.

Where previous generations of 3GPP-compliant networks have focused on serving a mobile UE that has a relatively fixed endpoint for its data flows (typically a network function or a gateway), the methods and apparata described above can be used to allow the applications and application functions that the UE is communicating with to become mobile themselves. This allows a function instantiated in a MEC resource to move to different locations so that a proximity to a mobile UE can be maintained.

Embodiments of the present technology can be carried out by a device (node, entity or function) within a wireless communication network (RAN or core). A device within a wireless communication network can be a real or virtualized networked device. Processing circuitry is used to direct operation of a relevant device, and can also be referred to as control circuitry or simply circuitry. The circuitry may include a microcontroller operatively coupled to memory, the memory including program instructions for execution by the microcontroller. The circuitry may include other digital or analog electronic circuitry, or a combination thereof, such as an application specific integrated circuit (ASIC), digital logic, etc.

Through the descriptions of the preceding embodiments, the present invention may be implemented by using hardware only or by using software for execution on a hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, ROM, persistent RAM, or other non-transitory storage medium. The software product includes a number of instructions that enable a wireless connecting computing device to execute the methods provided in the embodiments of the present invention. The software product may include a number of instructions that enable a computer device to execute operations for configuring or programming a digital logic apparatus in accordance with embodiments of the present invention.

All publications, patents and patent applications mentioned in this Specification are indicative of the level of skill of those skilled in the art to which this invention pertains and are herein incorporated by reference to the same extent as if each individual publication, patent, or patent applications was specifically and individually indicated to be incorporated by reference.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A system comprising at least one processor and at least one non-transitory memory storing instructions for execution by the at least one processor to implement a data repository function and a policy control function (PCF), the data repository function and the policy control function being communicatively coupled through an interface, wherein the data repository function is configured to:
   store data associated with an application function (AF) request and at least one of user data and policy data, wherein the AF request and the data associated with the AF request are associated with a user equipment (UE) and the AF request is to influence traffic routing for the UE, the UE being associated with a home public land mobile network (HPLMN), and wherein a visited public land mobile network (VPLMN), that is different from the HPLMN, comprises the data repository function and the PCF; and
   transmit a notification to the PCF, the notification indicative of the data associated with the AF request,
and wherein the PCF is configured to:
   subscribe, to the data repository function, to receive the AF request; and
   receive, from the data repository function, the notification;
and wherein the system further comprises:
   a network exposure function (NEF) implemented using the at least one processor and the at least one non-transitory memory, the NEF configured to: initiate storage of the data associated with the AF request in the data repository upon receiving the AF request from the AF; and
   a unified data management function (UDM) implemented using the at least one processor and the at least one non-transitory memory, wherein initiating storage of the data associated with the AF request comprises transmitting a request, to the UDM, to cause the UDM to interact with the data repository to store the data associated with the AF request.

2. The system of claim 1, wherein the data repository function is further configured to: receive the data associated with the AF request, the data and the AF request being from an application function and received via the Network Exposure Function in the VPLMN.

3. The system of claim 1, wherein the data repository function is further configured to: identify the PCF as a subscriber to receive the notification, and wherein the notification is transmitted to the PCF in response to said identifying the PCF as the subscriber.

4. The system of claim 1, wherein the data repository function is further configured to: update a previously stored version of the data associated with the AF request according to the received data associated with the AF request in the data repository.

5. The system of claim 2, wherein the data repository function is further configured to indicate to the NEF that the data associated with the AF request has been stored.

6. The system of claim 1, wherein the data repository function is further configured, in response to a request, from the PCF for obtaining the data associated with the AF request, to transmit the data associated with the AF request from the data repository to the PCF.

7. The system of claim 1, wherein the data repository function is further configured to transmit the notification to multiple PCFs operating in the network and including the PCF.

8. The system of claim 1, wherein the data associated with the AF request is stored as application data in the data repository.

9. The system of claim 1, wherein the NEF is further configured to:
   transmit, to another network function associated with the HPLMN, a request to identify the UE based on an external identifier included in the AF request;
   receive a response to the request to identify the UE, the response including another identifier of the UE;
   convert the external identifier included in the AF request to the other identifier of the UE; and
   initiate, in cooperation with the data repository function, storage of the other identifier as part of the data associated with the AF request.

10. The system of claim 1, wherein the UDM is further configured to:
    transmit, to another network function associated with the HPLMN, a request to identify the UE based on an external identifier included in the AF request;
    receive a response to the request to identify the UE, the response including another identifier of the UE;
    convert the external identifier included in the AF request to the other identifier of the UE; and
    initiate, in cooperation with the data repository function, storage of the other identifier as part of the data associated with the AF request.

11. A method, comprising:
    storing, by a data repository, data associated with an application function (AF) request and at least one of user data and policy data, wherein the AF request and the data associated with the AF request are associated with a user equipment (UE) and the AF request is to influence traffic routing for the UE, the UE being associated with a home public land mobile network (HPLMN), and wherein a visited public land mobile network (VPLMN), that is different from the HPLMN, comprises the data repository and a policy control function (PCF);

subscribing, by the PCF, to the data repository, to receive the AF request;

transmitting, by the data repository, a notification to the PCF, the notification indicative of the data associated with the AF request; and receiving, by the PCF, from the data repository, the notification; and initiating, by a network exposure function (NEF), storage of the data associated with the AF request in the data repository upon receiving the AF request from the AF wherein initiating storage of the data associated with the AF request comprises transmitting a request, to a unified data management function (UDM), to cause the UDM to interact with the data repository to store the data associated with the AF request.

12. The method of claim 11, further comprising: receiving, by the data repository, the data associated with the AF request, the data and the AF request being from an application function and received via the network exposure function (NEF) in the VPLMN.

13. The method of claim 11, further comprising: identifying, by the data repository, the PCF as a subscriber to receive the notification, and wherein the notification is transmitted to the PCF in response to said identifying the PCF as the subscriber.

14. The method of claim 11, further comprising: updating, by the data repository, a previously stored version of the data associated with the AF request according to the received data associated with the AF request in the data repository.

15. The method of claim 11, further comprising: in response to a request, from the PCF for obtaining the data associated with the AF request, transmitting the data associated with the AF request from the data repository to the PCF.

16. The method of claim 11, further comprising: transmitting, by the data repository, the notification to multiple PCFs operating in the network and including the PCF.

17. The method of claim 11, comprising:

transmitting, by the UDM, to another network function associated with the HPLMN, a request to identify the UE based on an external identifier included in the AF request;

receiving, at the UDM, a response to the request to identify the UE, the response including another identifier of the UE;

convert, by the UDM, the external identifier included in the AF request to the other identifier of the UE; and initiating, by the UDM, in cooperation with the data repository function, storage of the other identifier as part of the data associated with the AF request.

18. The method of claim 11, comprising:

transmitting, by the NEF, to another network function associated with the HPLMN, a request to identify the UE based on an external identifier included in the AF request;

receiving, at the NEF, a response to the request to identify the UE, the response including another identifier of the UE;

convert, by the NEF, the external identifier included in the AF request to the other identifier of the UE; and initiating, by the NEF, in cooperation with the data repository function, storage of the other identifier as part of the data associated with the AF request.

19. The method of claim 11, wherein the data associated with the AF request is stored as application data in the data repository.

20. The method of claim 11, wherein the data repository function is configured to indicate to the NEF that the data associated with the AF request has been stored.

* * * * *